United States Patent
Kitamura et al.

(10) Patent No.: US 7,344,217 B2
(45) Date of Patent: Mar. 18, 2008

(54) IMAGE FORMING APPARATUS AND ITS CONTROL METHOD, AND COMPUTER PROGRAM AND COMPUTER READABLE STORAGE MEDIUM

(75) Inventors: Hiroki Kitamura, Kawasaki (JP); Yoshiyuki Akiba, Yokohama (JP); Tsutomu Takada, Yokohama (JP); Shuichi Nakamura, Kawasaki (JP); Yusuke Yamamoto, Tokyo (JP); Masanao Motoyama, Tokyo (JP); Takeshi Akiyama, Tokyo (JP); Kenzo Tojima, Tokyo (JP); Takaaki Nagaoka, Hadano (JP)

(73) Assignee: Canon Kabushiki Kaisha, Tokyo (JP)

( * ) Notice: Subject to any disclaimer, the term of this patent is extended or adjusted under 35 U.S.C. 154(b) by 112 days.

(21) Appl. No.: 11/279,273

(22) Filed: Apr. 11, 2006

(65) Prior Publication Data
US 2006/0232620 A1    Oct. 19, 2006

(30) Foreign Application Priority Data
Apr. 15, 2005 (JP) .............................. 2005-118983
Apr. 15, 2005 (JP) .............................. 2005-118984

(51) Int. Cl.
*B41J 2/205* (2006.01)
(52) U.S. Cl. .................... 347/15; 347/116; 347/43; 358/1.9

(58) Field of Classification Search ................. 347/15, 347/43, 116; 358/1.9
See application file for complete search history.

(56) References Cited

U.S. PATENT DOCUMENTS

| 6,906,825 B1* | 6/2005 | Nakahara et al. ............. 358/1.9 |
| 2006/0119895 A1 | 6/2006 | Takata et al. ............... 358/3.26 |
| 2006/0226338 A1 | 10/2006 | Tojima et al. ........... 250/208.1 |

FOREIGN PATENT DOCUMENTS

| JP | 64-40956 | 2/1989 |
| JP | 8-85237 | 4/1996 |

* cited by examiner

*Primary Examiner*—Thinh Nguyen
(74) *Attorney, Agent, or Firm*—Fitzpatrick, Cella, Harper & Scinto

(57) ABSTRACT

A shifting amount of color compensation amount is calculated based on a shifting amount of color obtained from a shifting amount of color storage unit for each image forming unit, and shifting amount of color compensation in the pixel unit is performed by executing address conversion using the calculation result. A feature of an image to be processed is detected, and color density conversion compensation for performing shifting amount of color compensation in less than the pixel unit is performed according to the detected feature. Furthermore, half-tone processing or exceptional processing is selectively executed according to the detected feature.

22 Claims, 26 Drawing Sheets

FIG. 5

| REGION | WIDTH (mm) | SHIFT AMOUNT OF COLOR (mm) |
|---|---|---|
| REGION 1 | L1 | m1 |
| REGION 2 | L2 | m2 |
| REGION 3 | L3 | m3 |

FIG. 7A
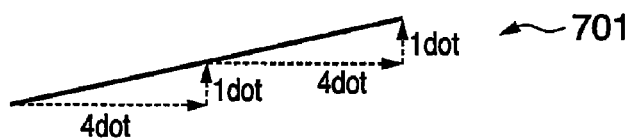
FIG. 7B
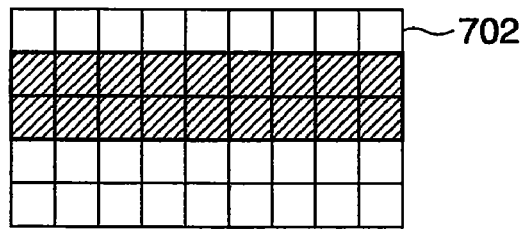
FIG. 7C
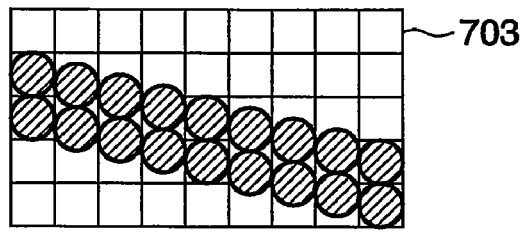
FIG. 7D
| Δy | 0 | 0.25 | 0.5 | 0.75 | 1 | 1.25 | 1.5 | 1.75 | 2 | 704 |
|---|---|---|---|---|---|---|---|---|---|---|
| k | 0 | 0 | 0 | 0 | 1 | 1 | 1 | 1 | 2 | |
| β = Δy − k | 0 | 0.25 | 0.5 | 0.75 | 0 | 0.25 | 0.5 | 0.75 | 0 | |
| α = 1 − β | 1 | 0.75 | 0.5 | 0.25 | 1 | 0.75 | 0.5 | 0.25 | 1 | |
FIG. 7E
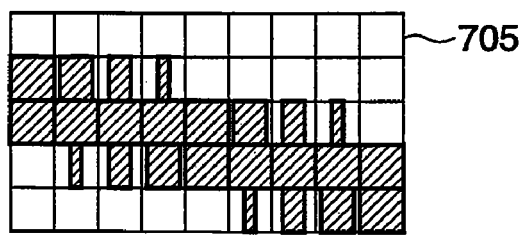
FIG. 7F
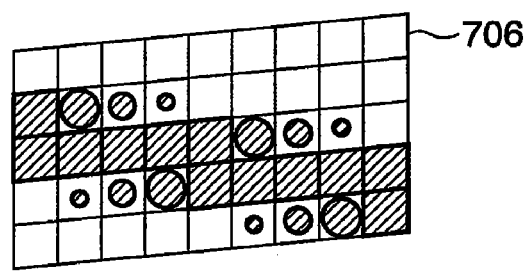

FIG. 13

| PAPER INFORMATION ||
|---|---|
| OFFSET | OFFSET |
| A4 | 01 |
| LETTER | 02 |
| B5 | 03 |
| SCANNER INFORMATION ||
| NUMBER OF BEAMS | 4 |
| C SCAN DIRECTION | Reverse |
| M SCAN DIRECTION | Forward |
| Y SCAN DIRECTION | Reverse |
| K SCAN DIRECTION | Forward |

412

FIG. 18A
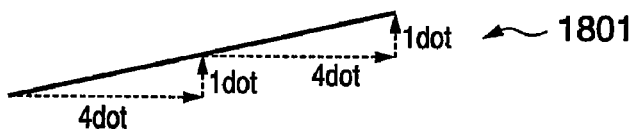
FIG. 18B
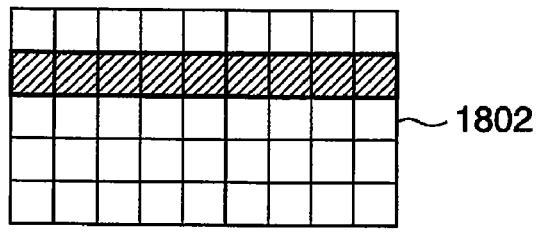
FIG. 18C
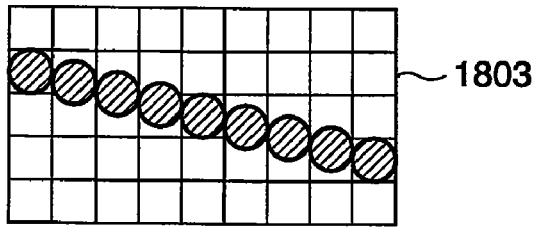
FIG. 18D
| $\Delta y$ | 0 | 0.25 | 0.5 | 0.1 85 | 1 | 1.25 | 1.5 | 1.1 85 | 2 |
|---|---|---|---|---|---|---|---|---|---|
| k | 0 | 0 | 0 | 0 | 1 | 1 | 1 | 1 | 2 |
| $\beta = 1.2(\Delta y - k)$ | 0 | 0.3 | 0.6 | 0.9 | 0 | 0.3 | 0.6 | 0.9 | 0 |
| $\alpha = 1.2 - \beta$ $(1 \geq \alpha \geq 0)$ | 1 | 0.9 | 0.6 | 0.3 | 1 | 0.9 | 0.6 | 0.3 | 1 |
1804
FIG. 18E
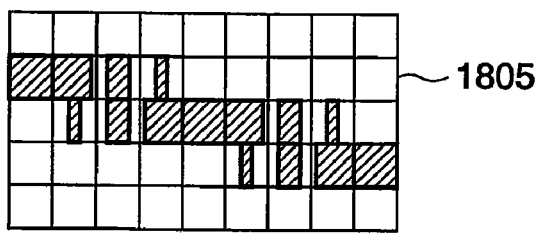
FIG. 18F
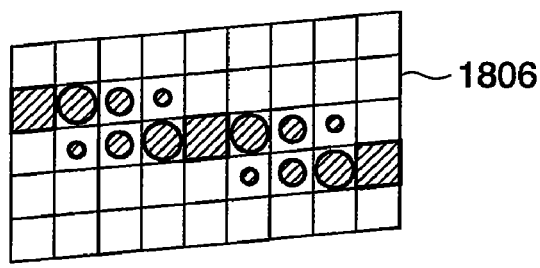

FIG. 19A
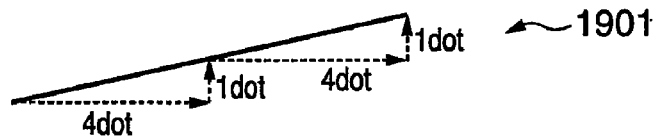
FIG. 19B
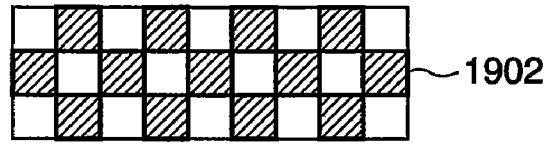
FIG. 19C
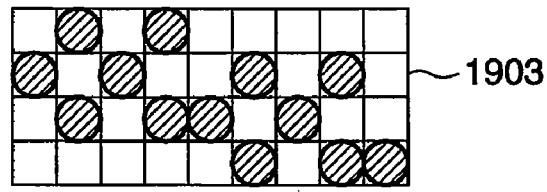
FIG. 19D
| Δy | 0 | 0.25 | 0.5 | 0.75 | 1 | 1.25 | 1.5 | 1.75 | 2 |
|---|---|---|---|---|---|---|---|---|---|
| k | 0 | 0 | 0 | 0 | 1 | 1 | 1 | 1 | 2 |
| β=0 | 0 | 0 | 0 | 0 | 0 | 0 | 0 | 0 | 0 |
| α=1 | 1 | 1 | 1 | 1 | 1 | 1 | 1 | 1 | 1 |
FIG. 19E
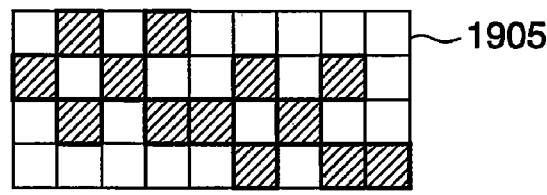
FIG. 19F
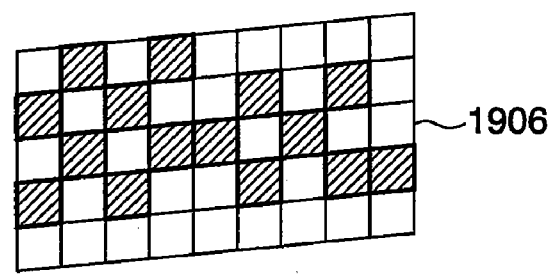

FIG. 23A
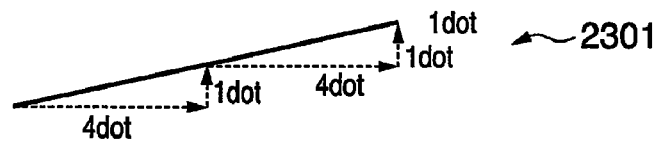
FIG. 23B
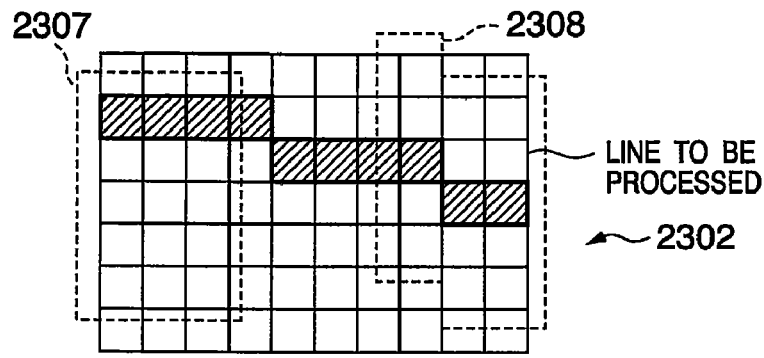
FIG. 23C
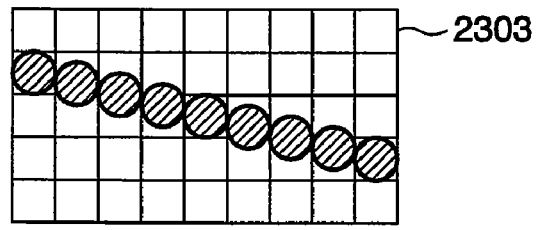
FIG. 23D
| Δy | 0 | 0.25 | 0.5 | 0.75 | 1 | 1.25 | 1.5 | 1.75 | 2 | 2304 |
|---|---|---|---|---|---|---|---|---|---|---|
| k | 0 | 0 | 0 | 0 | 1 | 1 | 1 | 1 | 2 | |
| β=1.2(Δy−k) | 0 | 0.3 | 0.6 | 0.9 | 0 | 0.3 | 0.6 | 0.9 | 0 | |
| α=1.2−β (1≧α≧0) | 1 | 0.9 | 0.6 | 0.3 | 1 | 0.9 | 0.6 | 0.3 | 1 | |
FIG. 23E
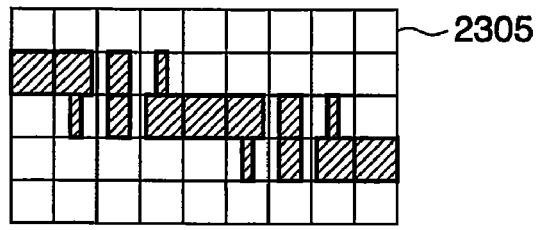
FIG. 23F
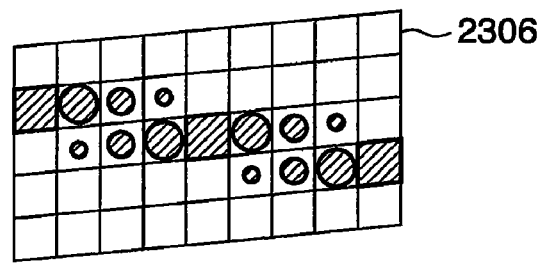

FIG. 24A
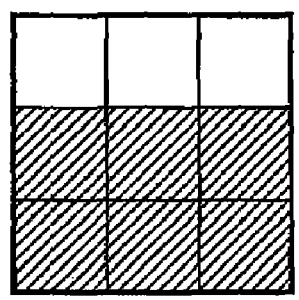 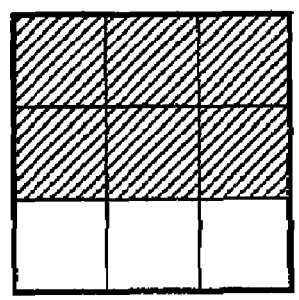
FIG. 24B
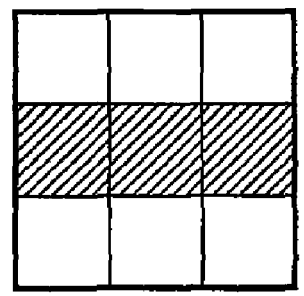
FIG. 24C
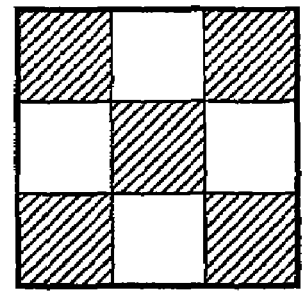 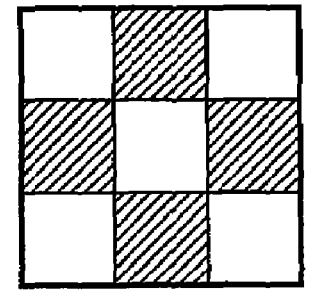

2601  2602  2603  2604  2605

IMAGE FORMING APPARATUS AND ITS CONTROL METHOD, AND COMPUTER PROGRAM AND COMPUTER READABLE STORAGE MEDIUM

FIELD OF THE INVENTION

The present invention relates to an image forming apparatus and its control method, and a computer program and computer-readable storage medium.

BACKGROUND OF THE INVENTION

A conventional color image forming apparatus using an electrophotography method normally adopts the following system. That is, a single photosensitive body undergoes development of colors using a plurality of developing units, and an exposure-development-transfer process is repeated a plurality of times, thus overlaying and forming color images on a single transfer sheet. The color images are fixed to obtain a full-color image.

According to this system, an image forming process must be repeated three or four times (if black is used), and it takes much time. As a method of removing such shortcomings, the following method is known. That is, a plurality of photosensitive bodies are used, and toner images obtained for respective colors are overlaid in turn on a transfer sheet to obtain a full-color print via a single paper feed operation. According to this method, the throughput can be greatly improved. On the other hand, a shifting amount of color problem occurs due to shifting amounts of color of respective colors on a transfer sheet resulting from errors of the accuracy of position and diameters of photosensitive bodies, and errors of accuracy of position of optical systems, and it is difficult to obtain a high-quality full-color image.

As a method for preventing this shifting amount of color, for example, the following method may be used. That is, a test toner image on a transfer sheet or a transfer belt which forms a transfer unit is detected, and the optical path of each optical system is compensated or the image write start position of each color is be compensated based on the detection result (see Japanese Patent Laid-Open No. 64-40956). However, this method poses the following problems.

First, in order to compensate the optical path of the optical system, a compensation optical system including a light source and f-θ lens, a mirror in the optical path, and the like must be mechanically moved to adjust the position of the test toner image. For this purpose, high-precision movable members are required, resulting in high cost. Furthermore, since it takes much time until compensation is completed, it is impossible to frequently perform compensation. However, an optical path length difference may change along with an elapse of time due to temperature rise of mechanical components. In such case, it becomes difficult to prevent shifting amount of color by compensating the optical path of the optical system.

Second, in order to compensate the image write start position, it is possible to conduct shifting amount of color compensation of the left end and upper left portion but it is impossible to compensate for the tilt of the optical system and to compensate for any magnification errors due to the optical path length difference.

The following arrangement has also been proposed (see Japanese Patent Laid-Open No. 8-85237). That is, the output coordinate positions of image data of respective colors are converted into those free from any registration errors. After that, based on the converted image data of respective colors, the positions of modulated light beams are compensated by an amount less than the minimum dot unit of a color signal. Since the output coordinate position of image data for each color is compensated with respect to an image that has undergone half-tone processing, the reproducibility of halftone dots of a half-tone image deteriorates. As a result, color inconsistency may occur and moire may become obvious.

FIG. 4 shows such example. An input image 101 has constant color density values. Upon printing an image 102 obtained by applying arbitrary compensation shifting amount of color to the input image 101 in practice, since the image color density value and a toner color density for that image color density value do not have a linear relationship, although the input image 101 has constant color density values, an image whose color density values are not constant is printed. When such non-uniform color density values are periodically repeated, moieé becomes obvious, and a high-quality color image cannot be obtained.

Furthermore, since the print speed increases, a photosensitive body scanned by a laser beam does not stand still while the laser beam is being scanned, and moves by a predetermined amount according to the print conditions during a laser scanning time period. If the scan directions of lasers of respective colors agree with each other, the inclination of a scan line due to this moving amount does not pose any problems. However, the inclination of the scan line may cause deterioration of image quality such as color inconsistency depending on the moving amount of the photosensitive body between colors for which scans start from opposite directions. Also, this moving amount varies depending on conditions such as a print medium and the like and cannot be compensated by simple processing.

As described above, it is conventionally difficult to provide an image which is free from any moire that may be caused by compensation of shifting amount of color and suffers less deterioration of image quality.

SUMMARY OF THE INVENTION

The present invention can provide an image which is free from any moire that may be caused by compensation of shifting amount of color and suffers less deterioration of image quality.

The invention which corresponds to an example of preferred embodiments of the present invention is an image forming apparatus having an image forming unit which includes an image carrier, an exposure unit used to expose the image carrier, and a developing unit used to visualize an electrostatic latent image generated by exposure using a printing medium, comprising: a shifting amount of color storage unit which stores information of shifting amount of color that represents a shifting amount of color of an exposure position in a sub-scan direction upon exposing the image carrier while scanning the image carrier in a main scan direction; a shifting amount of color compensation amount calculator which calculates a shifting amount of color compensation amount required to compensate the shifting amount of color in the sub-scan direction based on the shifting amount of color; an image data storage unit which stores image data formed by a plurality of pixels; an address converter which converts a coordinate of a read address of the image data storage unit based on a shifting amount of color in a pixel unit of the shifting amount of color compensation amount, and reads out pixel data of a pixel of interest from the image data storage unit in accordance with the converted address information; a pixel color density converter which converts a pixel color density of the pixel data read out from the image data storage unit by the address converter based on a shifting amount of color less than a pixel unit of the shifting amount of color compensation amount; a half-tone processing unit which performs half-tone processing of the pixel data which has undergone the color density conversion by the pixel color density converter; an exceptional processing unit which performs exceptional processing of the pixel data which has undergone the color density conversion by the pixel color density converter; a process determination unit which detects a feature of image data formed by pixels in a predetermined region having the pixel of interest as a center of the image data stored in the image data storage unit, and determines one of the exceptional processing and the half-tone processing to be selected; and an output unit which selects a processing result of one of the exceptional processing unit and the half-tone processing unit based on a determination result of the process determination unit, and outputs the selected processing result as an exposure control signal of the exposure unit.

The invention which corresponds to another example of preferred embodiments of the present invention is an image forming apparatus having an image forming unit which includes an image carrier, an exposure unit used to expose the image carrier, and a developing unit used to visualize an electrostatic latent image generated by exposure using a printing medium, comprising: a shifting amount of color storage unit which stores information of shifting amount of color that represents a shifting amount of color of an exposure position in a sub-scan direction upon exposing the image carrier while scanning the image carrier in a main scan direction; a shifting amount of color compensation amount calculator which calculates a shifting amount of color compensation amount required to compensate the shifting amount of color in the sub-scan direction based on the shifting amount of color; a first image data storage unit which stores image data formed by a plurality of pixels; an address converter which converts a coordinate of a read address of the first image data storage unit based on a shifting amount of color in a pixel unit of the shifting amount of color compensation amount, reads out image data from the first image data storage unit in accordance with the converted address information, and stores the readout image data in a second image data storage unit; a pixel color density converter which reads out pixel data of a pixel of interest from the second image data storage unit, and converts a pixel color density of the pixel data based on a shifting amount of color less than a pixel unit of the shifting amount of color compensation amount; a half-tone processing unit which performs half-tone processing of the pixel data which has undergone the color density conversion by the pixel color density converter; an exceptional processing unit which performs exceptional processing of the pixel data which has undergone the color density conversion by the pixel color density converter; a process determination unit which detects a feature of image data formed by pixels in a predetermined region having the pixel of interest as a center of the image data stored in the second image data storage unit, and determines one of the exceptional processing and the half-tone processing to be selected; and an output unit which selects a processing result of one of the exceptional processing unit and the half-tone processing unit based on a determination result of the process determination unit, and outputs the selected processing result as an exposure control signal of the exposure unit, and in that the predetermined region is set to cancel conversion of the address based on the shifting amount of color in the pixel unit by the address converter.

The invention which corresponds to still another example of preferred embodiments of the present invention is an image forming apparatus having an image forming unit which includes an image carrier, an exposure unit used to expose the image carrier, and a developing unit used to visualize an electrostatic latent image generated by exposure using a printing medium, comprising: a shifting amount of color storage unit which stores information of shifting amount of color that represents a shifting amount of color of an exposure position in a sub-scan direction upon exposing the image carrier while scanning the image carrier in a main scan direction; a shifting amount of color compensation amount calculator which calculates a shifting amount of color compensation amount required to compensate the shifting amount of color in the sub-scan direction based on the shifting amount of color; an image data storage unit which stores image data formed by a plurality of pixels; an address converter which converts a coordinate of a read address of the image data storage unit based on a shifting amount of color in a pixel unit of the shifting amount of color compensation amount, and reads out pixel data of a pixel of interest from the image data storage unit in accordance with the converted address information; a pixel color density converter which converts a pixel color density of the pixel data read out from the image data storage unit by the address converter based on a shifting amount of color less than a pixel unit of the shifting amount of color compensation amount; a half-tone processing unit which performs half-tone processing of the pixel data which has undergone the color density conversion by the pixel color density converter; an exceptional processing unit which performs exceptional processing of the pixel data which has undergone the color density conversion by the pixel color density converter; a process determination unit which detects a feature of image data formed by pixels in a predetermined region having the pixel of interest as a center of the image data stored in the image data storage unit using attribute information that represents an attribute of the pixel data, and determines one of the exceptional processing and the half-tone processing to be selected; and an output unit which selects a processing result of one of the exceptional processing unit and the half-tone processing unit based on a determination result of the process determination unit, and outputs the selected processing result as an exposure control signal of the exposure unit.

The invention which corresponds to yet another example of preferred embodiments of the present invention is an image forming apparatus having an image forming unit which includes an image carrier, an exposure unit used to expose the image carrier, and a developing unit used to visualize an electrostatic latent image generated by exposure using a printing medium, comprising: a shifting amount of color storage unit which stores information of shifting amount of color that represents a shifting amount of color of an exposure position in a sub-scan direction upon exposing the image carrier while scanning the image carrier in a main scan direction; a shifting amount of color compensation amount calculator which calculates a shifting amount of color compensation amount required to compensate the shifting amount of color in the sub-scan direction based on the shifting amount of color; a first image data storage unit which stores image data formed by a plurality of pixels; an address converter which converts a coordinate of a read address of the first image data storage unit based on a shifting amount of color in a pixel unit of the shifting amount of color compensation amount, reads out image data from the first image data storage unit in accordance with the converted address information, and stores the readout image data in a second image data storage unit; a pixel color density converter which reads out pixel data of a pixel of interest from the second image data storage unit, and converts a pixel color density of the pixel data based on a shifting amount of color less than a pixel unit of the shifting amount of color compensation amount; a half-tone processing unit which performs half-tone processing of the pixel data which has undergone the color density conversion by the pixel color density converter; an exceptional processing unit which performs exceptional processing of the pixel data which has undergone the color density conversion by the pixel color density converter; a process determination unit which detects a feature of image data formed by pixels in a predetermined region having the pixel of interest as a center of the image data stored in the second image data storage unit using attribute information that represents an attribute of the pixel data, and determines one of the exceptional processing and the half-tone processing to be selected; and an output unit which selects a processing result of one of the exceptional processing unit and the half-tone processing unit based on a determination result of the process determination unit, and outputs the selected processing result as an exposure control signal of the exposure unit, and in that the predetermined region is set to cancel conversion of the address based on the shifting amount of color in the pixel unit by the address converter.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 5 is a view showing an example of information stored in a shifting amount of color storage unit according to the first embodiment of the present invention;

FIGS. 7A to 7F are views for explaining processing in a color density converter according to the first embodiment of the present invention;

FIG. 13 is view showing an example of engine profile data according to the first embodiment of the present invention;

FIGS. 18A to 18F are views for explaining the color density conversion processing for a thin line image according to the first embodiment of the present invention;

FIGS. 19A to 19F are views for explaining the color density conversion processing for an image having a repetitive pattern according to the first embodiment of the present invention;

FIGS. 23A to 23F are views for explaining the color density conversion processing according to the third embodiment of the present invention;

FIGS. 24A to 24C are views for explaining an example of a smoothing determination pattern according to the third embodiment of the present invention;

DETAILED DESCRIPTION OF THE PREFERRED EMBODIMENTS

Preferred embodiments of the present invention will now be described in detail in accordance with the accompanying drawings.

First Embodiment

Figure 2:
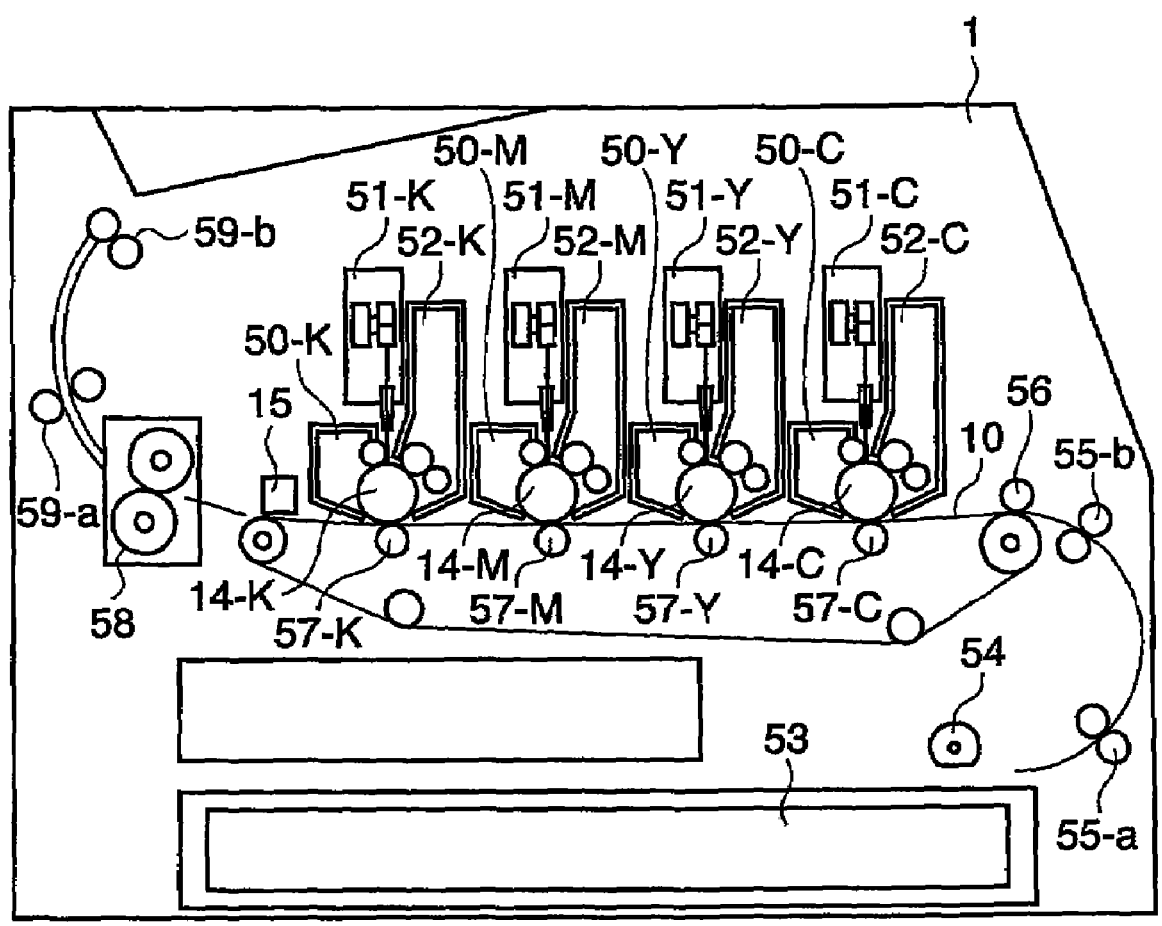
FIG. 2 is a sectional view showing an example of the arrangement of the image forming apparatus according to the first embodiment of the present invention.

FIG. 2 is a schematic sectional view for explaining the arrangement of an image forming apparatus according to a preferred embodiment of the present invention. As shown in FIG. 2, the image forming apparatus according to this embodiment has a structure of a four-drum type color laser beam printer.

This image forming apparatus mounts a transfer medium cassette 53 in a lower portion of the right side surface of the main body. Printing media, printing paper sheets, transmitting sheets, or the like set in the transfer medium cassette 53 are picked up one by one by a feeding roller 54, and the picked-up medium is fed to image forming units by guide roller pairs 55-a and 55-b. In the image forming units, a transfer feeding belt 10 that feeds the transfer medium is stretched flat via a plurality of rotary rollers in the transfer medium feeding direction (from the right to the left in FIG. 2). The transfer medium is electrostatically attracted on the most upstream portion of the transfer feeding belt 10. Four photosensitive drums 14-C, 14-Y, 14-M, and 14-K as drum-shaped image carriers are linearly arranged to face the belt conveyor surface so as to form the image forming units (note that C, Y, M, and K respectively indicate color components: cyan, yellow, magenta, and black).

Note that the image forming units for respective color components have the same arrangement except for their toner colors stored, and the image forming unit for color component C will be explained below (the same applies to the following description that covers only C for other elements unless otherwise specified).

The C image forming unit has a charger 50-C which uniformly charges the surface of the photosensitive drum 14-C, a developer 52-C which stores C toner, and visualizes (develops) an electrostatic latent image generated on the photosensitive drum 14-C, and an exposure unit 51-C. A predetermined gap is formed between the developer 52-C and charger 50-C. A laser beam emitted by the exposure unit 51-C which comprises a laser scanner is scanned and exposed in a direction perpendicular to the plane of the drawing onto the photosensitive drum 14-C, whose surface is uniformly charged by the charger 50-C, via the aforementioned gap. In this way, the portion that has been scanned and exposed has a charged state different from that of a non-exposed portion, thus forming an electrostatic latent image. The developer 52-C transfers toner to the electrostatic latent image to visualize it (to convert the latent image into a toner image; develop it).

A transfer unit 57-C is arranged on the other side of the conveyor surface of the transfer feeding belt 10. The toner image formed (developed) on the circumferential surface of the photosensitive drum 14-C is attracted by a charge, which is generated on the fed printing medium by a transfer electric field formed by the transfer unit 57-C, and is transferred onto the surface of the printing medium. By repeating the same processing for the remaining color components Y, M, and K, color toners of C, M, Y, and K are transferred in turn onto the printing medium. After that, a fixing device 58 fixes the toner images onto the printing medium by thermally melting the color toners, and the printing medium is discharged outside the apparatus via discharge roller pairs 59-a and 59-b.

In the above example, toner images of the respective color components are transferred onto the printing medium. However, after toner images of the respective color components are transferred onto the transfer feeding belt, the toner images generated on the transfer feeding belt may be transferred again onto the printing medium (secondary transfer). The transfer belt in such case is called an intermediate transfer belt.

Figure 3:
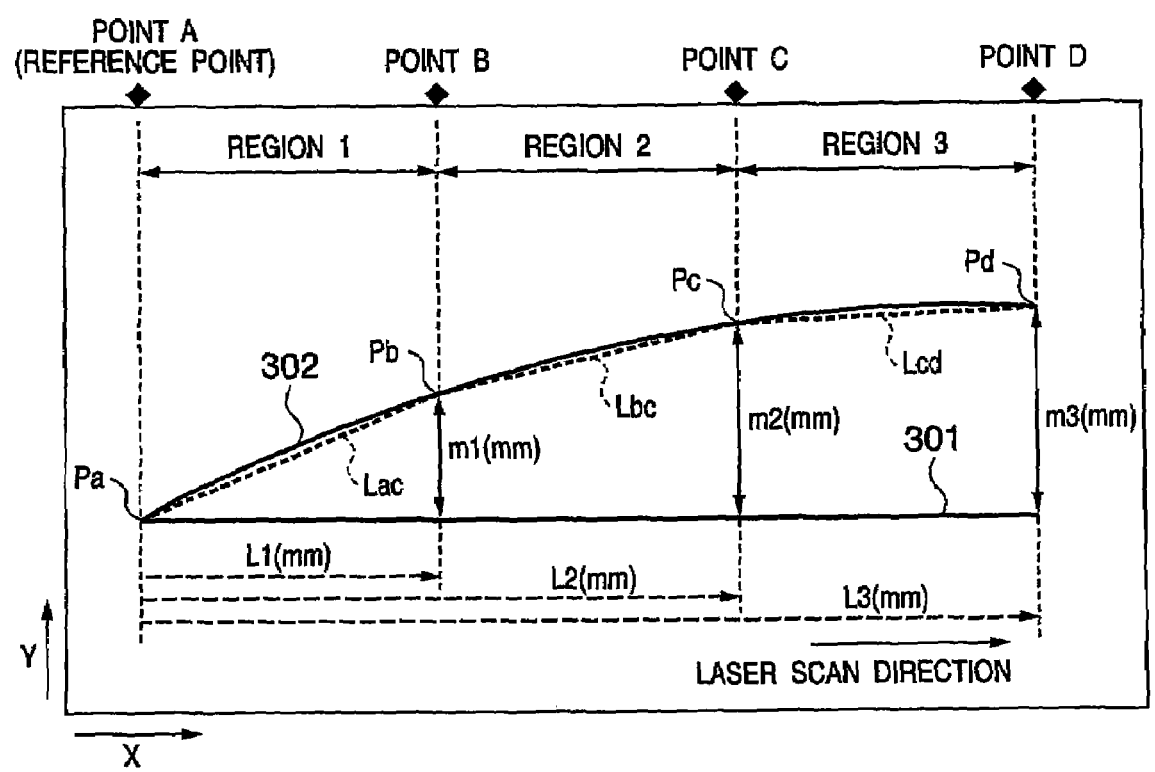
FIG. 3 is a view for explaining the displacement of a main scan line on a photosensitive drum according to the first embodiment of the present invention.
Figure 4:
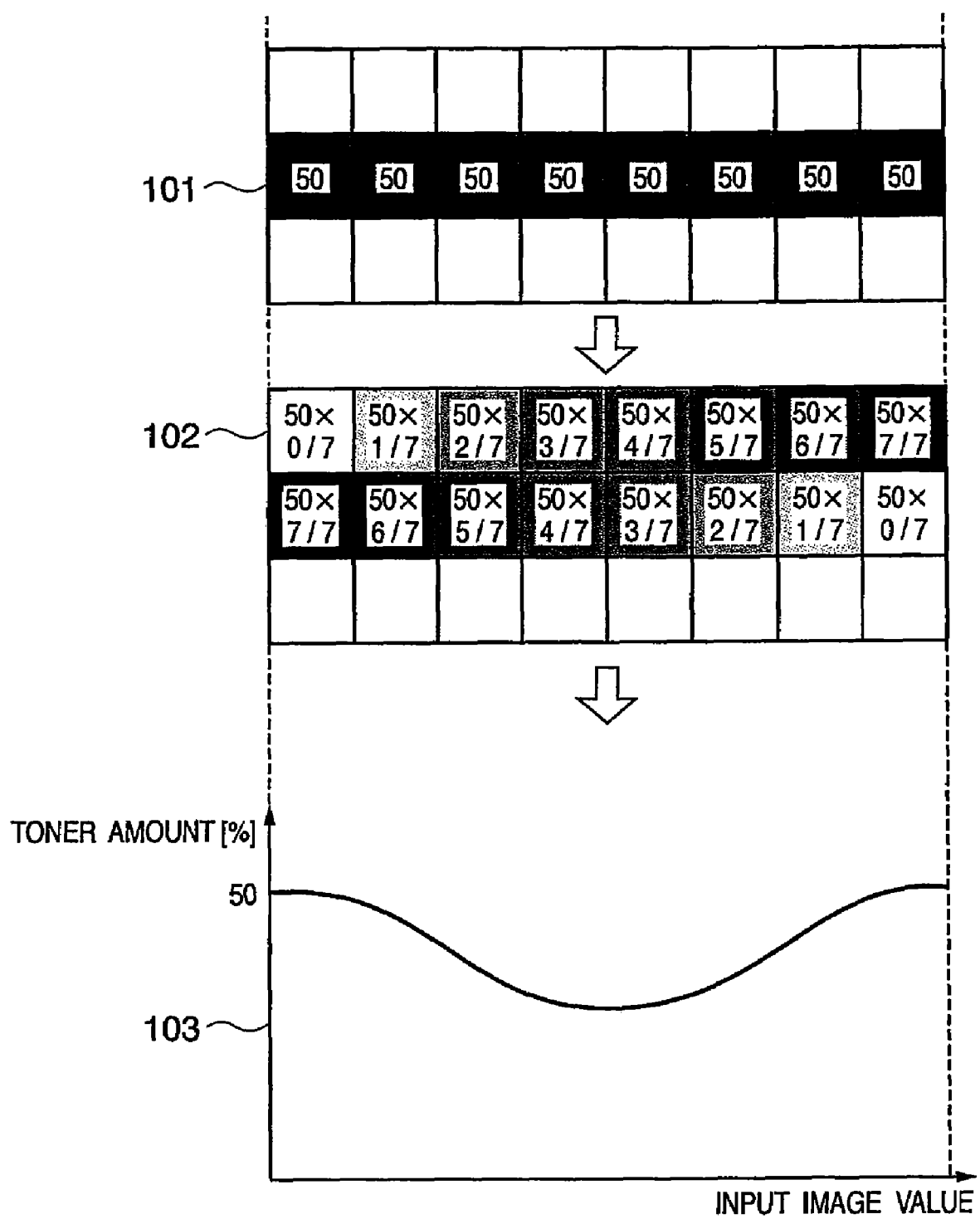
FIG. 4 is a view for explaining the color density inconsistency in image forming processing according to the first embodiment of the present invention.

FIG. 3 is an image view for explaining the displacement of a main scan line which is scanned on the photosensitive drum 14-C (or may be scanned on the drum 14-M, 14-Y, or 14-K) as an image carrier. The horizontal direction in FIG. 3 agrees with the scan direction of a laser beam, and the vertical direction agrees with the rotation direction of the photosensitive drum (also the feeding direction of the printing medium).

Referring to FIG. 3, reference numeral 301 denotes an ideal main scan line which is vertically scanned with respect to the rotation direction of the photosensitive drum 14. Reference numeral 302 denotes an image of a real main scan line which has suffered a right upward inclination and curvature resulting from errors of the accuracy of position and diameter of each photosensitive drum 14, and errors of accuracy of position of the exposure unit 51 of each color. Note that the main scan line represents an exposure position when the photosensitive drum 14 as an image carrier is exposed while being scanned in the main scan direction. If the image forming unit of any color suffers such inclination and curvature of the main scan line, shifting amount of color occurs upon simultaneously transferring toner images of a plurality of colors onto a transfer medium.

In this embodiment, the shifting amounts of color of in a sub-scan direction between the ideal main scan line 301 and real main scan line 302 are measured at a plurality of points (points B, C, and D) to have point A as a reference point, which serves as the scan start position of the print region, in the main scan direction (X-direction) perpendicular to the rotation direction of the photosensitive drum 14. Note that a direction which agrees with the rotation direction of the photosensitive drum 14 and is perpendicular to the main scan direction will be referred to as a sub-scan direction hereinafter. The main scan line is divided into a plurality of regions (region 1 between Pa and Pb, region 2 between Pb and Pc, and region 3 between Pc and Pd) in correspondence with the points where the shifting amounts of color are measured. Then, the inclinations of main scan lines of the respective regions are approximated by straight lines (Lab, Lbc, and Lcd) that connect neighboring points.

Therefore, when a difference (m1 for region 1, m2−m1 for region 2, or m3−m2 for region 3) between the shifting amounts of color of neighboring points assumes a positive value, it indicates that the main scan line of the region of interest has a positive inclination (right upward inclination in FIG. 3). On the other hand, when the difference assumes a negative value, it indicates that the main scan line of that region has a negative inclination (right downward inclination in FIG. 3).

Figure 1:
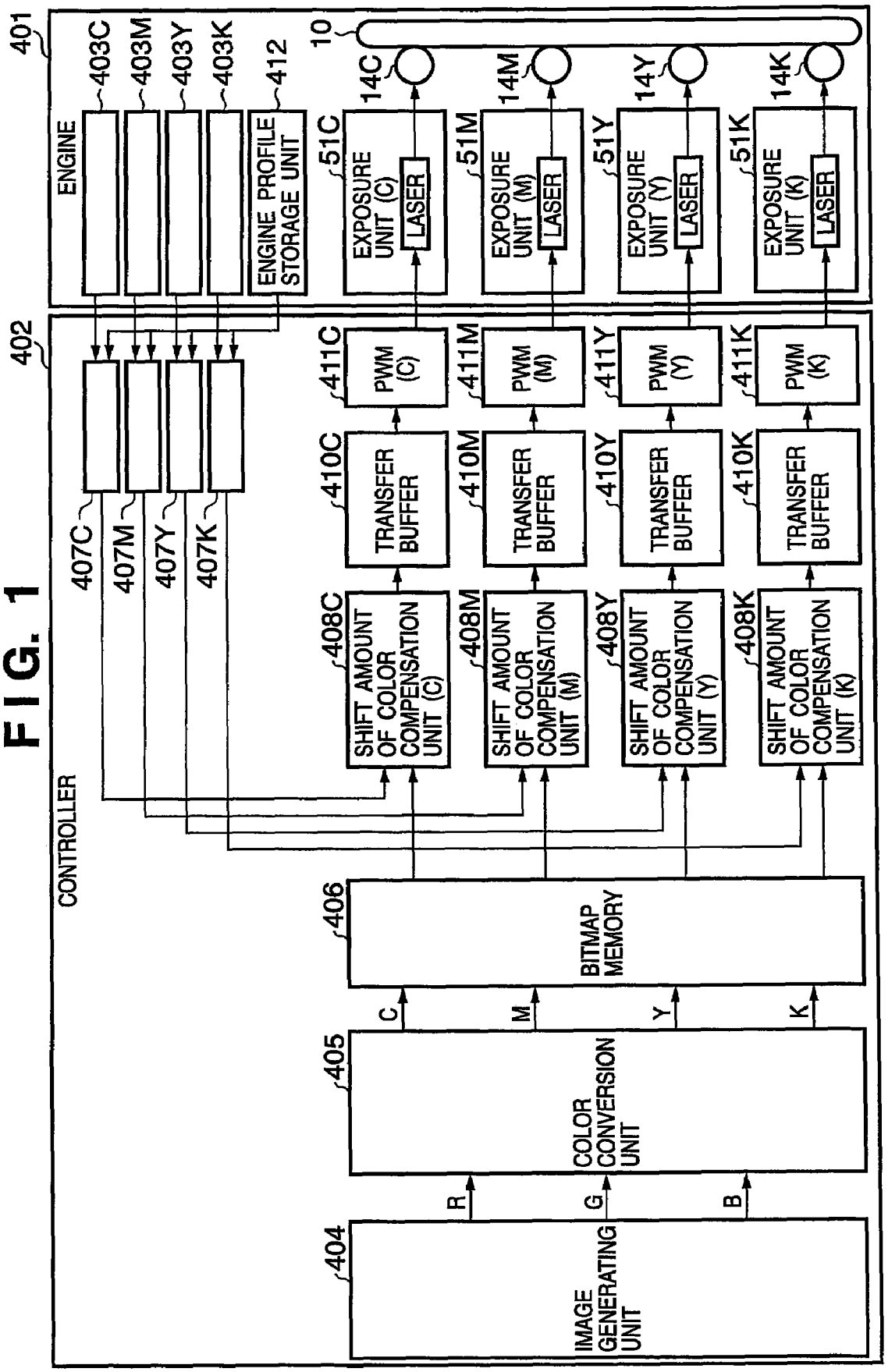
FIG. 1 is a schematic block diagram showing the arrangement of a controller and engine of an image forming apparatus according to the first embodiment of the present invention.

FIG. 1 is a block diagram showing an example of the arrangement of a printer engine and controller of the image forming apparatus according to this embodiment. The operation of the shifting amount of color compensation processing for compensating shifting amount of color which is caused by the inclination and curvature of the main scan line will be described below with reference to FIG. 1.

Referring to FIG. 1, reference numeral 401 denotes a printer engine which executes actual printing processing based on image bitmap information generated by a controller 402. The controller 402 is accommodated in a circuit board, and is electrically connected to the printer engine 401 when it is accommodated in the apparatus.

Reference numerals 403C, 403M, 403Y, and 403K denote shifting amount of color storage units for respective colors, which respectively hold information of shifting amount of color for respective image forming units of respective colors, which are written in the manufacturing process of the apparatus. For example, each shifting amount of color storage unit can be implemented by a writable, non-volatile memory such as an EEPROM or the like. In FIG. 1, the shifting amount of color storage units are arranged in correspondence with the color components. However, since the information size to be stored is sufficiently small, one memory element may store shifting amounts of color for all the color components.

Each of the shifting amount of color storage units 403C, 403M, 403Y, and 403K according to this embodiment stores shifting amounts of color in the sub-scan direction between the real main scan line 302 and ideal main scan line 301, which are measured at the plurality of points, as described above using FIG. 3, as information indicating the inclination and curvature of the main scan line. An engine profile (storage unit) 412 stores configuration information associated with print processing in the printer engine. This engine profile 412 is also implemented by a writable, non-volatile memory.

To allow easy understanding, the following explanation will be given without that of the profile engine 412, and compensation processing using this profile engine 412 will be described in detail later.

FIG. 5 shows an example of information to be stored in the shifting amount of color storage unit 403C (the same applies to the units 403M, 403Y, and 403K, but information to be stored differs depending on individual differences). In FIG. 5, L1 to L3 and m1 to m3 have the same meanings as those in FIG. 3.

In this embodiment, each of the shifting amount of color storage units 403C, 403M, 403Y, and 403K stores the shifting amounts of color between the ideal main scan line 301 and real main scan line 302. However, the present invention is not limited to such specific information stored in the shifting amount of color storage units 403C, 403M, 403Y, and 403K as long as the information can identify the characteristics of the inclination and curvature of the real main scan line.

As information to be stored in each of the shifting amount of color storage units 403C, 403M, 403Y, and 403K, the shifting amounts of color may be measured in the manufacturing process of the apparatus, and may be stored as information unique to the apparatus. Alternatively, a detection mechanism that detects the shifting amounts of color may be mounted on the apparatus itself to form a predetermined pattern used to measure displacement for the image carrier of each color, and the shifting amounts of color detected by the detection mechanism may be stored.

The controller 402 executes print processing by compensating image data to cancel the shifting amounts of color of the main scan lines stored in the shifting amount of color storage units 403C, 403M, 403Y, and 403K.

An image generating unit 404 generates raster image data, which allows print processing, based on print data (PDL data, image data, or the like) received from a computer apparatus or the like (not shown), and outputs that data as RGB data (8 bits/color; 256 tone levels) for respective dots. Since this processing is known to those who are skilled in the art, a detailed description thereof will be omitted.

A color conversion unit 405 converts the RGB data from the image generating unit 404 into data (8 bits/color) on a CMYK space which can be processed by the engine 401 (such conversion is implemented by LOG conversion and UCR processing). A bitmap memory 406 stores the data on the CMYK color space for respective colors. This bitmap memory 406 temporarily stores raster image data to be printed. The bitmap memory 406 can be implemented as a page memory that can store image data for one page or a band memory that can store data for a plurality of lines.

Reference numerals 407C, 407M, 407Y, and 407K denote shifting amount of color compensation calculators. The shifting amount of color compensation calculators calculate shifting amount of color compensation amounts in the sub-scan direction corresponding to coordinate information in the main scan direction, designated by shifting amount of color compensation units 408C, 408M, 408Y, and 408K, for respective dots, based on the information of shifting amount of color in the sub-scan direction of the main scan lines, which are stored in the shifting amount of color storage units 403C, 403M, 403Y, and 403K. The calculated compensation amounts are output to the shifting amount of color compensation units 408C, 408M, 408Y, and 408K (note that the engine profile 412 is excluded in this case).

Let x (dots) be coordinate data in the main scan direction, and $\Delta y$ (dots) be the shifting amount of color compensation amount in the sub-scan direction. Then, calculation formulas of respective regions based on FIG. 3 are as follows.

Region 1: $\Delta y1 = x*(m1/L1)$ ($0 \leq x < L1$)

Region 2: $\Delta y2 = m1/\text{Ldot} + (x-(L1/\text{Ldot}))*((m2-m1)/(L2-L1))$ ($L1 \leq x < L1+L2$)

Region 3: $\Delta\Delta y3 = m2/\text{Ldot} + (x-(L2/\text{Ldot}))*((m3-m2)/(L3-L2))$ ($L1+L2 \leq x \leq L1+L2+L3$)

where Ldot is the size of one dot (unit: "mm/dot").

In the above formulas, L1, L2, and L3 are distances (unit: mm) from the print start position to the left ends of regions 1, 2, and 3 in the main scan direction. m1, m2, and m3 are shifting amounts of color (unit: mm) in the sub-scan direction between the ideal main scan line 301 and real main scan line 302 at the left ends of regions 1, 2, and 3. After this $\Delta y$ is determined, the value x is determined when $\Delta y$ reaches one dot to be reproduced by print processing, and a read position in the vertical direction by an address converter in the shifting amount of color compensation unit 408C is changed for this value.

On the other hand, from the engine 401 side, engine profile data as configuration information associated with print processing, which is stored in the engine profile 412, includes offset information from a reference point of each paper size, the scan directions of beams of respective colors in the engine, the scan amount and the number of beams used in the scanner, and the like, as shown in FIG. 13.

The scan exposure directions of laser beams and the inclination amount corresponding to the number of scan exposure beams will be described below using FIGS. 14A to 14C.

Figure 14A:
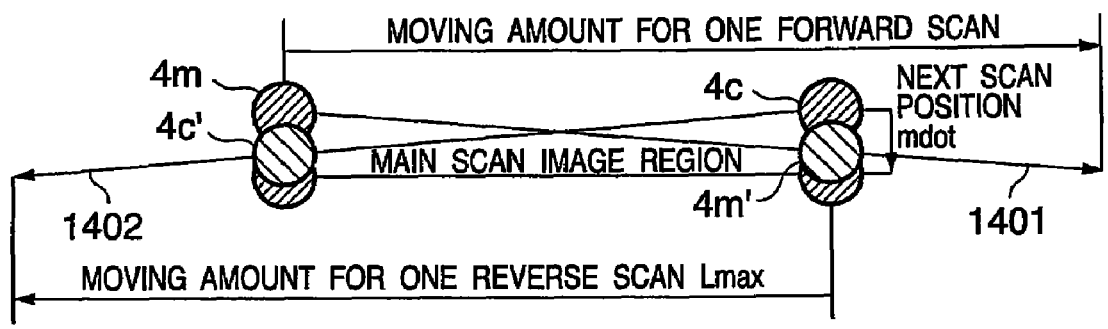
FIGS. 14A to 14C are views showing the relationship among the dot colors, scan directions, and main scan line when the number of dots printed per scan is changed according to the first embodiment of the present invention.

FIG. 14A exemplifies a case wherein one dot is printed per scan in the sub-scan direction, and the scan direction of magenta is opposite to that of cyan. FIG. 14B exemplifies a case wherein two dots are printed per scan in the sub-scan direction. FIG. 14C exemplifies a case wherein four dots are printed per scan in the sub-scan direction.

The example of FIG. 14A will be described below. An image forming start position for magenta is a dot $4m$, and that for cyan is dot $4c$. Hence, the start positions of these colors do not match. This is because the scan directions of magenta and cyan are opposite to each other. A path of dots formed per scan for magenta is indicated by a line 1401, and that for cyan is indicated by a line 1402. A dot $4m'$ and dot $4c'$ on the lines are arbitrary magenta and cyan dots formed within one scan period. In this way, magenta dots are formed on the line 1401, and cyan dots are formed on the line 1402.

Referring to FIG. 14A, a moving amount for one scan (i.e., a section where dots are printed during one scan) is represented by Lmax. A shifting amount of color in the sub-scan direction from the printing position of the dot $4m$ ($4c$) upon starting dot printing to that of a dot upon completion of one main scan is represented by mdot. Based on Lmax and mdot, the inclination of each of the lines 1401 and 1402 can be calculated by mdot/Lmax.

Figure 14B:
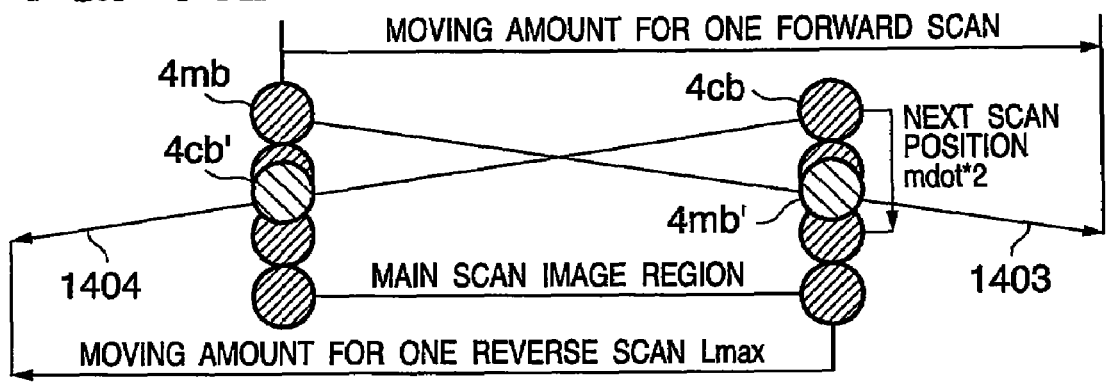
Figure 14C:
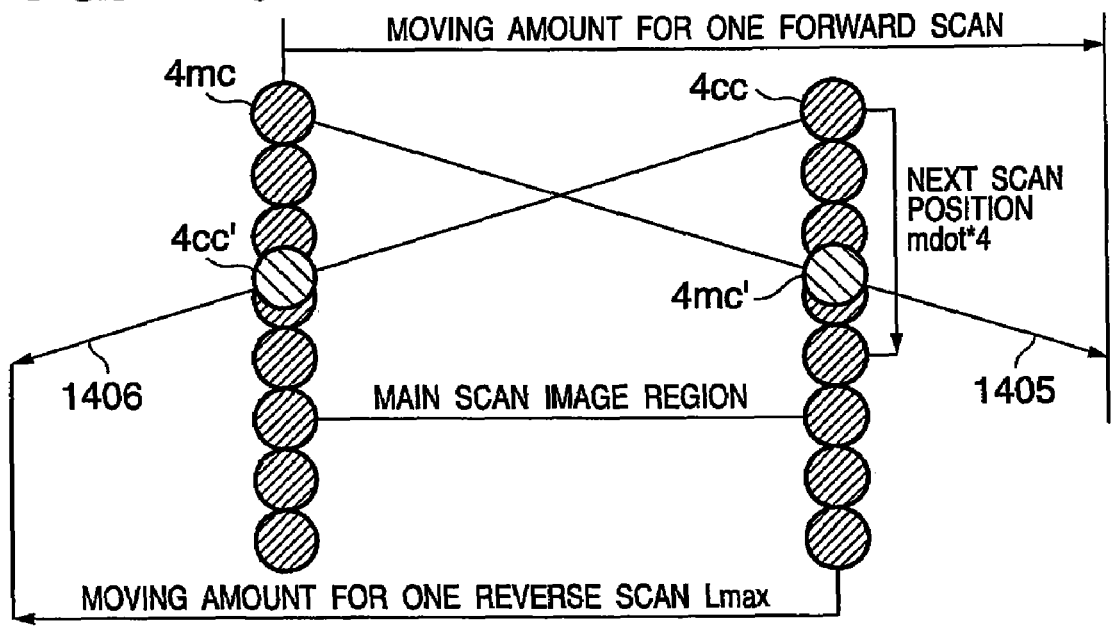

FIGS. 14B and 14C show a case wherein two dots and four dots are printed in the sub-scan direction within one main scan period. At this time, shifting amounts of color in the sub-scan direction from the printing positions of dots $4mb$ and $4mc$ ($4cb$ and $4cc$) upon starting dot printing to those of dots upon completion of one main scan are respectively represented by 2*mdot and 4*mdot. Therefore, the inclination of each of lines 1403 and 1404 can be calculated by 2*mdot/Lmax. Also, the inclination of each of lines 1405 and 1406 can be calculated by 4*mdot/Lmax.

More specifically, let n be the number of beams used in one scan (the number of dots to be printed in the sub-scan direction in one scan). The inclination can be given by n*mdot/Lmax. Assuming that the displacement direction in FIG. 3 is positive, calculations are made by adding coefficients of inclination with the negative sign in case of Forward and the positive sign in case of Reverse.

A case will be examined below with reference to FIGS. 15A to 15C wherein the printing speed changes due to different rotational speeds of the photosensitive drums.

Figure 15A:
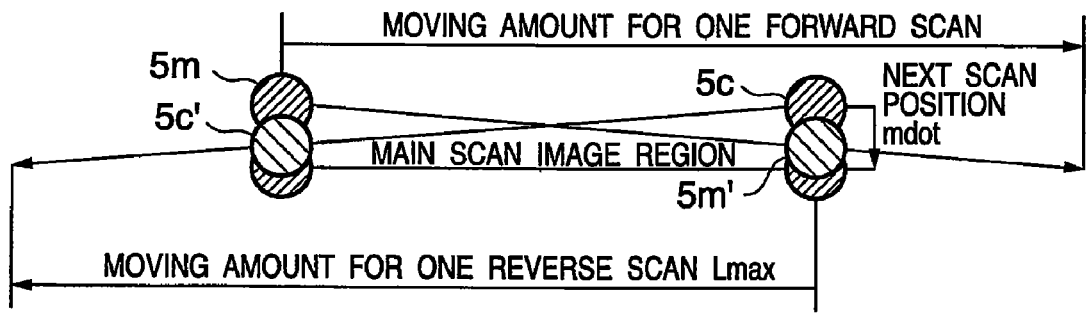
FIGS. 15A to 15C are views showing the relationship among the dot colors, scan directions, and main scan line when the printing speed changes according to the first embodiment of the present invention.
Figure 15B:
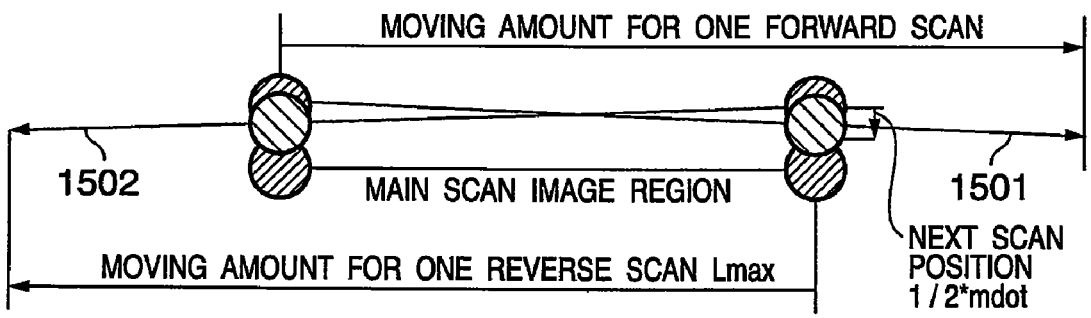
Figure 15C:
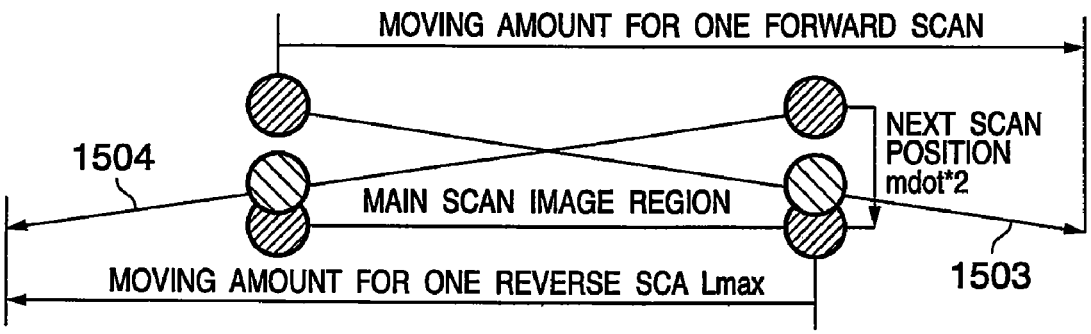

FIG. 15A shows the same case as FIG. 14A. FIG. 15B shows a case wherein printing is done at a ½ speed. In case of FIG. 15B, the rotational speed of the photosensitive drum 14 is half a normal speed. Hence, the moving amount of the photosensitive drum upon making two main scans matches that for one main scan at the normal printing speed. Therefore, the inclination of each of lines 1501 and 1502 can be calculated by further multiplying the inclination coefficient, which is calculated according to the number n of beams in FIGS. 14A to 14C, by ½.

On the other hand, when the printing speed is doubled (the rotational speed of the photosensitive drum 14 is twice the normal speed), the photosensitive drum moves for two scans at the normal speed during one main scan. Hence, the inclination of each of lines 1503 and 1504 can be calculated by further multiplying the inclination coefficient, which is calculated according to the number n of beams in FIGS. 14A to 14C, by 2.

As described above, when the printing speed becomes k times, the inclination can be represented by k*n*mdot/Lmax based on the number n of beams and the printing speed k.

Therefore, the shifting amount of color Δy on the entire region including the shifting amount of color and engine profile is:

when the main scan direction=Forward, $\Delta y = -x^* k^* n^* \text{mdot}/\text{Lmax} + x^*(m1+L)$ $(0 \leq x < L) -$
$x^* k^* n^* \text{mdot}/\text{Lmax} + m1/\text{Ldot} + (x-L/\text{Ldot})^*(m2/L)$
$(L \leq x < 2L) - x^* k^* n^*(\text{mdot}/\text{Lmax} + (m1+m2)/\text{Ldot} +$
$(x-2L/\text{Ldot})^*(m3/L)$ $(2L \leq x \leq 3L)$ when the main scan direction=Reverse, $\Delta y = x^* k^* n^* \text{mdot}/\text{Lmax} + x^*(m1/L)$ $(0 \leq x < L)$
$x^* k^* n^* \text{mdot}/\text{Lmax} + m1/\text{Ldot} + (x-L/\text{Ldot})^*(m2/L)$
$(L \leq x < 2L)x^* k^* n^* \text{mdot}/\text{Lmax} + (m1+m2)/\text{Ldot} +$
$(x-2L/\text{Ldot})^*(m3/L)$ $(2L \leq x \leq 3L)$ Upon printing on a printing medium, the printing start position must be offset in correspondence with the size of a printing medium such as a printing sheet or the like. For this reason, the value "y" used in address conversion processing of an image in the sub-scan direction starts from a value "yobj" at the offset position. A compensation amount in the sub-scan direction at the offset position can be calculated by the above equation used to calculate y.

The offset position is determined with reference to the size of one dot. That is, address conversion in the sub-scan direction is made by a quotient value obtained upon dividing yobj by the dot size. Therefore, even when yobj is indivisible by one dot size, if no address conversion is made by the quotient value, printing cannot be done at a desired printing position.

As one address conversion method, a conversion amount is calculated based on the quotient value as an address conversion initial value of the shifting amount of color calculator 407C. As another method, the read timing in the sub-scan direction is adjusted. Since the offset value itself assumes a constant value and is common (fixed) while print processing is made for an identical printing medium, the address conversion initial value of the shifting amount of color calculator 407C is set to be zero. When the timing is then adjusted based on the calculated conversion amount, address conversion can be substantially implemented. In the following description of the shifting amount of color calculator 407C, the former one of these two different methods is adopted.

The arrangement of the shifting amount of color calculator 407C will be described below with reference to FIG. 16. The processing of the shifting amount of color calculator 407C will also be described below with reference to the flowchart of FIG. 17.

Figure 16:
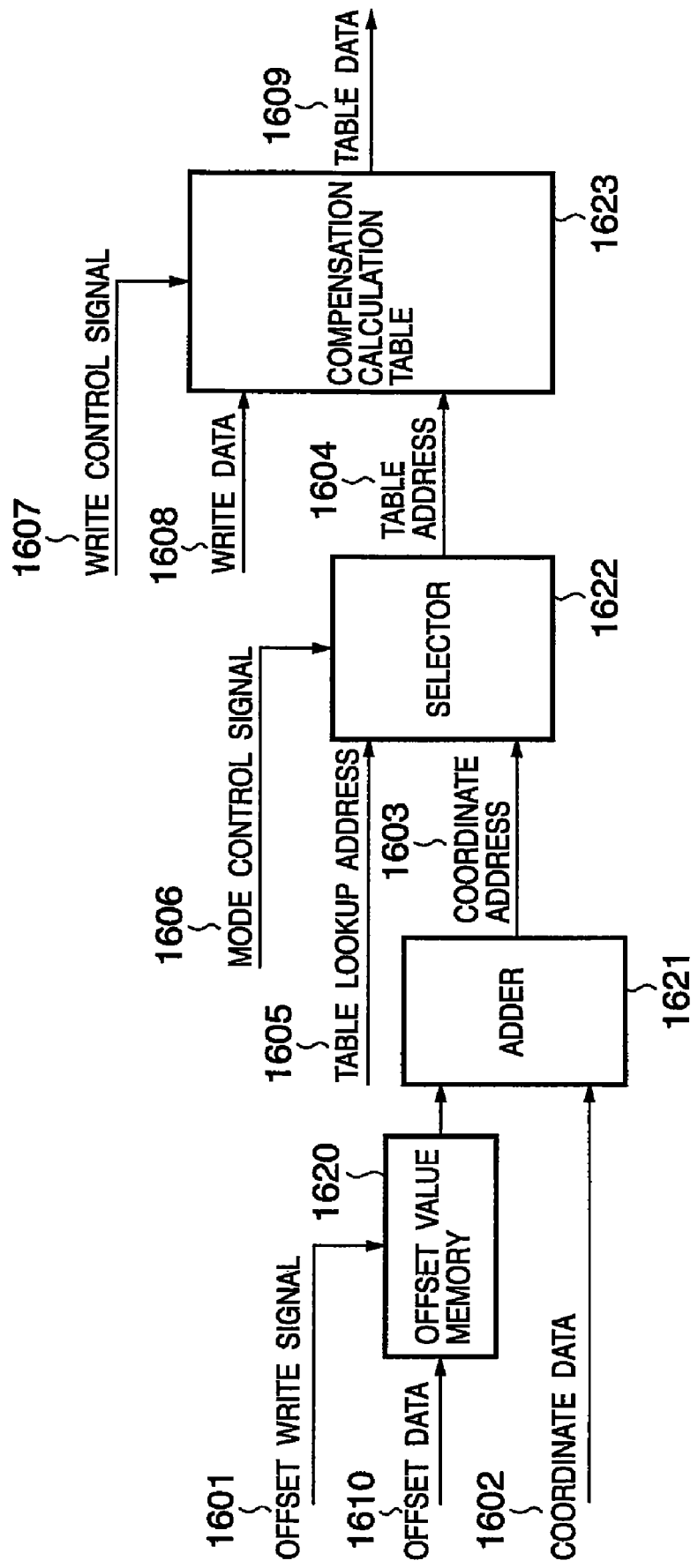
FIG. 16 is a block diagram showing an example of the arrangement of a shifting amount of color calculator according to the first embodiment of the present invention.

Referring to FIG. 16, reference numeral 1620 denotes an offset value memory. A CPU (not shown) of the image forming apparatus transmits offset data stored in the engine profile 412 to the offset value memory 1620 as offset data 1610. The transmitted offset data 1610 is written in synchronism with an offset write signal 1601 that controls the write timing. The offset data 1610 stored at that time corresponds to O1, O2, and O3 in FIG. 13.

Reference numeral 1621 denotes an adder, which adds the offset value stored in the offset value memory 1620 to coordinate data 1602 of a pixel of interest to be processed, and outputs a coordinate address 1603 to a selector 1622. The coordinate data 1602 in this case is provided from the shifting amount of color compensation unit 408C. The shifting amount of color compensation unit 408C supplies the coordinate data 1602 to be processed to the shifting amount of color calculator 407C so as to acquire a shifting amount of color compensation amount (table data 1609) required for address conversion from a compensation calculation table 1623.

Reference numeral 1622 denotes a selector, which selects one of a table lookup address 1605 and the coordinate address 1603 output from the adder 1621 in accordance with a mode control signal 1606. The table lookup address 1605 is supplied from the CPU when the CPU writes or reads out data in or from the compensation calculation table 1623. The mode control signal 1606 is transmitted from the CPU. When the mode signal 1606 is "1", the selector 1622 selects the table lookup address 1605; when it is "0", the selector 1622 selects the coordinate address 1603.

When a table address 1604 of the compensation calculation table 1623 is output from the selector 1622, table data 1609 corresponding to the table address 1604 is output from the compensation calculation table 1623. The output from the compensation calculation table 1623 is supplied to the shifting amount of color compensation unit 408C. When the table data 1609 is written in the compensation calculation table 1623, write data 1608 is input from the CPU and is written in synchronism with a write control signal 1607.

Figure 17:
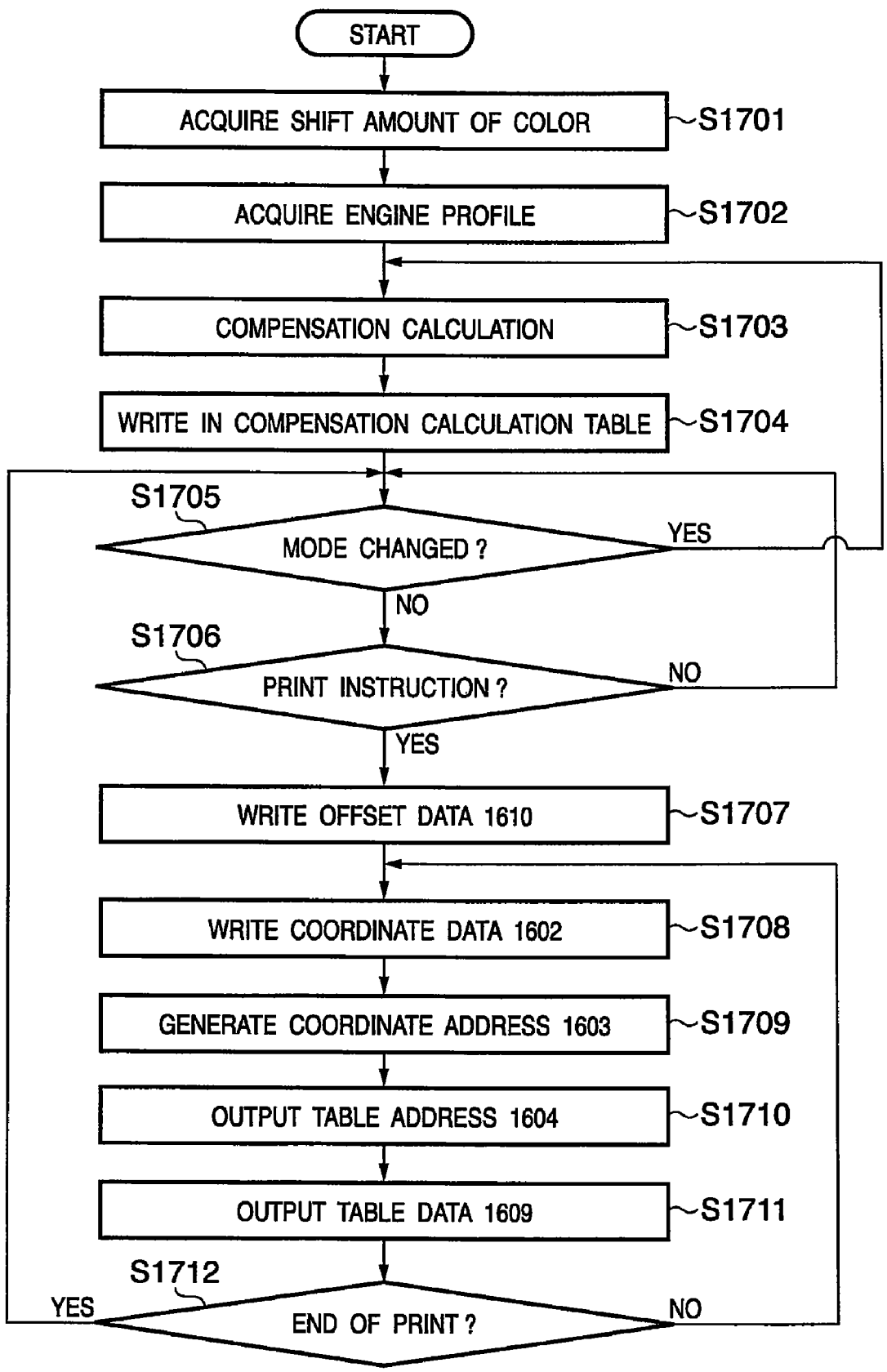
FIG. 17 is a flowchart showing an example of the processing in the shifting amount of color calculator according to the first embodiment of the present invention.

Referring to FIG. 17, in step S1701 the shifting amount of color calculator 407C acquires a shifting amount of color from the shifting amount of color storage unit 403C. Also, the shifting amount of color calculator 407C acquires an engine profile from the engine profile storage unit 412 in step S1702. In step S1703, the shifting amount of color calculator 407C calculates compensation data (offset values of X- and Y-addresses, and weighting coefficients $\alpha$ and $\beta$ to be described later) based on the profile in consideration of a printing mode (the size and feeding direction of a printing sheet, printing speed, and the like). In step S1704, the shifting amount of color calculator 407C writes these calculated data at the corresponding address positions in the compensation calculation table 1623. In this way, the calculations of the table data in the compensation calculation table can be executed upon activating the image forming apparatus or upon changing the printing speed in accordance with the state of the printer engine 401, and the calculation results are stored in the compensation calculation table 1623.

It is then checked in step S1705 if the printing mode is changed. If it is determined that the printing mode is changed ("YES" in step S1705), the processes in steps S1703 and S1704 are executed again. That is, the contents of the compensation calculation table 1623 are updated. On the other hand, if it is determined that the printing mode remains the same ("NO" in step S1705), it is checked in step S1706 if printing has started. If the start of printing is detected ("YES" in step S1706), the flow advances to step S1707 to load the offset data 1610 onto the offset value memory 1620. In step S1708, the coordinate data 1602 is acquired.

The offset data 1610 and coordinate data 1602 are output to the adder 1621 to generate a coordinate address 1603 in step S1709. The coordinate address 1603 is supplied to the selector 1622, which also receives the table lookup address 1605 from the CPU. The selector 1622 selects one of the coordinate address 1603 and table lookup address 1605 based on the mode control signal 1606, and outputs the table address 1604 in step S1710.

In step S1711, table data 1609 corresponding to the table address 1604 input from the selector 1622 is output from the compensation calculation table 1623. It is checked in step S1712 if printing is completed. If printing is not completed yet ("NO" in step S1712), the flow returns to step S1708; otherwise ("YES" in step S1712), the flow returns to step S1705 to repeat the above processing.

The shifting amount of color compensation unit 408C in FIG. 1 will be described below. The shifting amount of color compensation unit 408C adjusts the output timings of bitmap data stored in the bitmap memory 406 and adjusts the exposure amounts for respective pixels based on the shifting amount of color compensation amounts, which are calculated for respective dots and output from the corresponding shifting amount of color calculator 407C, so as to compensate for shifting amount of color due to the inclination and curvature of the main scan line. In this way, shifting amount of color (registration error) upon transferring toner images of respective colors onto a transfer medium can be prevented. The shifting amount of color compensation unit 408C receives the table data 1609 as the shifting amount of color compensation amount for each pixel from the shifting amount of color calculator 407C.

Figure 8:
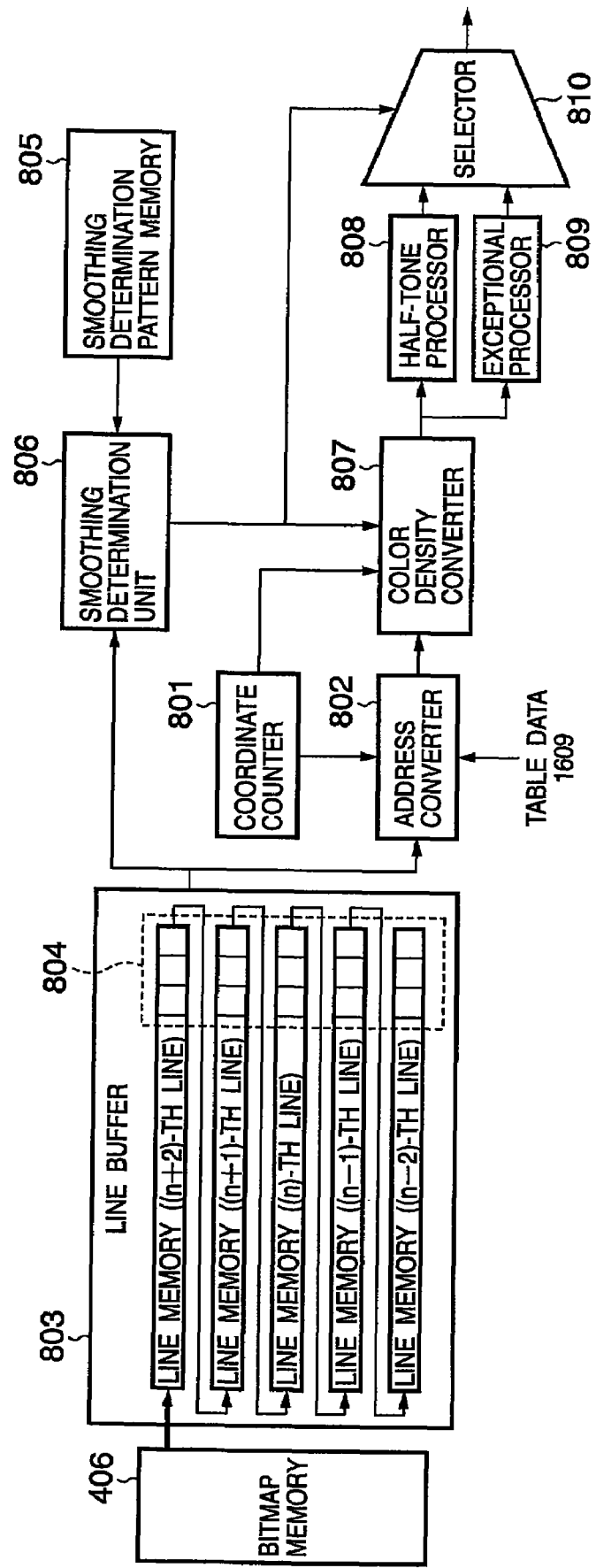
FIG. 8 is a block diagram showing an example of the arrangement of a shifting amount of color compensation unit according to the first embodiment of the present invention.

An example of the detailed arrangement of the shifting amount of color compensation unit 408C is as shown in, e.g., FIG. 8. The shifting amount of color compensation unit 408C comprises a coordinate counter 801, address converter 802, line buffer 803, smoothing determination pattern memory 805, smoothing determination unit 806, color density converter 807, half-tone processor 808, exceptional processor 809, and selector 810.

The coordinate counter 801 outputs coordinate position data in the main scan direction and sub-scan direction where shifting amount of color compensation processing is to be executed to the address converter 802 and color density converter 807. Also, the coordinate counter 801 outputs the coordinate data 1602 to the shifting amount of color calculator 407C.

The address converter 802 executes compensation processing of the integer part of the compensation amount $\Delta y$, i.e., reconstruction processing in the pixel unit in the sub-scan direction, based on the coordinate position data in the main scan direction and sub-scan direction from the coordinate counter 801 and table data 1609 (corresponding to the compensation amount $\Delta y$) obtained from the shifting amount of color calculator 407C.

The line buffer 803 includes memories for respective lines, which store image information before shifting amount of color compensation processing from the bitmap memory 406.

The smoothing determination pattern memory 805 stores a window pattern with a predetermined size, which is used in the smoothing determination unit 806. The smoothing determination unit 806 compares window data 804 obtained from the line buffer 803 with the smoothing determination pattern stored in the smoothing determination memory 805. With this comparison, features of an image are extracted, and color density conversion processing to be executed by the color density converter 807 is selected.

FIG. 8 shows a case wherein the window data 804 has a 3×5 size. However, the window size is not limited to this. In consideration of thin line detection to be described later, a window region equal to or larger than the above value is preferably set.

The color density converter 807 executes, for an image to be processed, compensation processing of the decimal part of $\Delta y$ based on the coordinate position data in the main scan direction from the coordinate counter 801 and the compensation amount $\Delta y$ provided as the table data 1609, i.e., it performs compensation in less than the pixel unit by adjusting the exposure ratios of neighboring dots in the sub-scan direction. This adjustment amount is determined by the smoothing determination unit 806. The color density converter 807 uses the line buffer 803 to refer to neighboring dots in the sub-scan direction.

Reference numeral 808 denotes a half-tone processor which applies half-tone processing to image data that has undergone the color density conversion by the color density converter 807. Reference numeral 809 denotes an exceptional processor which applies exceptional processing to the image data which has undergone the color density conversion by the color density converter 807. Reference numeral 810 denotes a selector which selects one of the outputs from the half-tone processor 808 and exceptional processor 809 in accordance with a selection signal from the smoothing determination unit 806, and supplies the selected output to a transfer buffer 410C.

Figure 12:
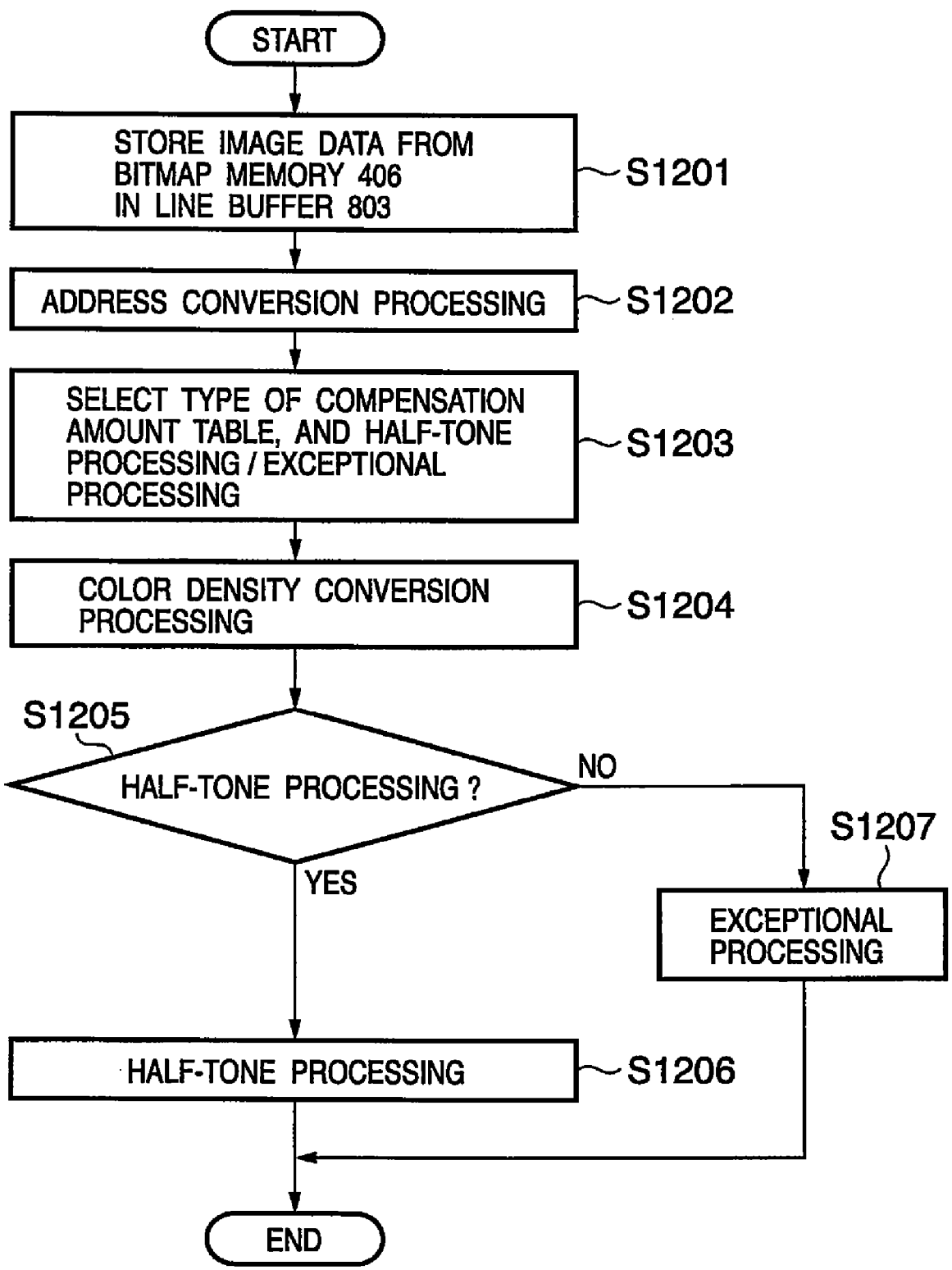
FIG. 12 is a flowchart showing an example of processing in a shifting amount of color correcting unit according to the first embodiment of the present invention.

The flow of the processing in the shifting amount of color compensation unit 408C is as shown in the flowchart of FIG. 12.

Referring to FIG. 12, in step S1201 image data read out from the bitmap memory 406 is stored in the line buffer 803. In step S1202, the address converter 802 performs address conversion of image data within the window 804 read out from the line buffer 803 to compensate for shifting amount of color equal to or larger than one line, and outputs the compensation result to the color density converter 807.

In step S1203, the smoothing determination unit 806 compares image data in the window 804 read out from the line buffer 803 with the smoothing determination pattern stored in the smoothing determination pattern memory 805 to extract a feature of image information, and to determine a compensation amount table based on the feature. Also, the smoothing determination unit 806 determines one of the half-tone processing and exceptional processing to be selected.

In step S1204, the color density converter 807 executes color density conversion processing using the compensation amount table designated by the smoothing determination unit 806. The color density converter 807 checks in step S1205 in accordance with a selection instruction from the smoothing determination unit 806 if the half-tone processing is to be executed. If the half-tone processing is selected ("YES" in step S1205), the half-tone processing is executed in step S1206. On the other hand, if the half-tone processing is not selected ("NO" in step S1205), the exceptional processing is executed in step S1207. The processes in respective steps above will be described in detail below.

The processing for compensating the shifting amount of color of the integer part (shifting amount of color in the pixel unit) of the shifting amount of color compensation amount $\Delta y$ in the address converter 802 will be described below with reference to FIGS. 6A to 6C.

Figure 6A:
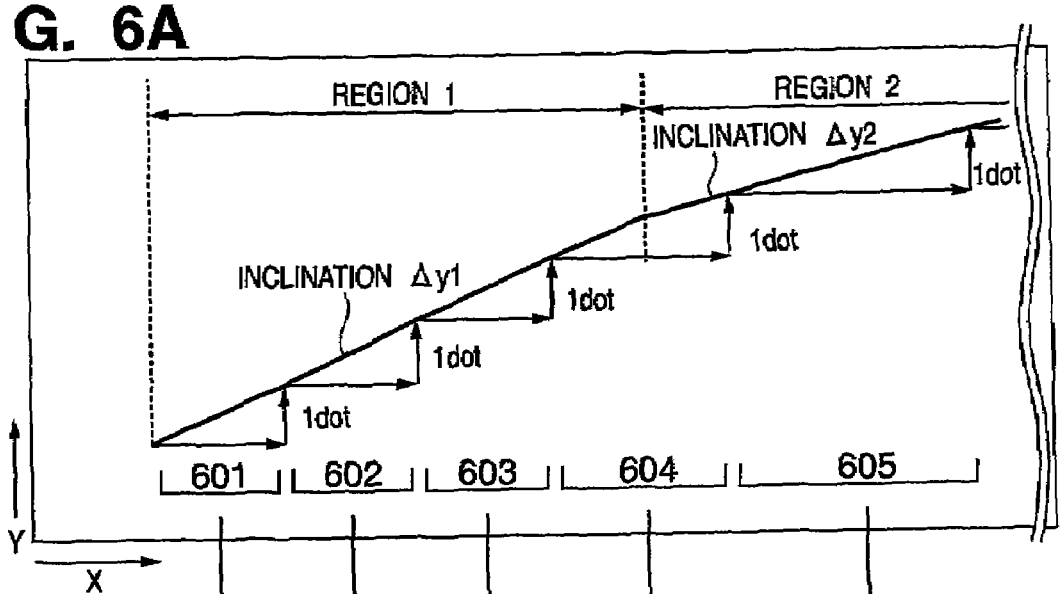
FIGS. 6A to 6C are views for explaining the operation for compensating a shifting amount of color in the sub-scan direction based on the integer part of the shifting amount of color compensation amount according to the first embodiment of the present invention.

As shown in FIG. 6A, the address converter 802 offsets the coordinate in the sub-scan direction (Y-direction) of image data stored in the bitmap memory 406 in accordance with the value of the integer part of the shifting amount of color compensation amount $\Delta y$ calculated from the shifting amounts of color of the main scan lines approximated by straight lines.

Figure 6B:
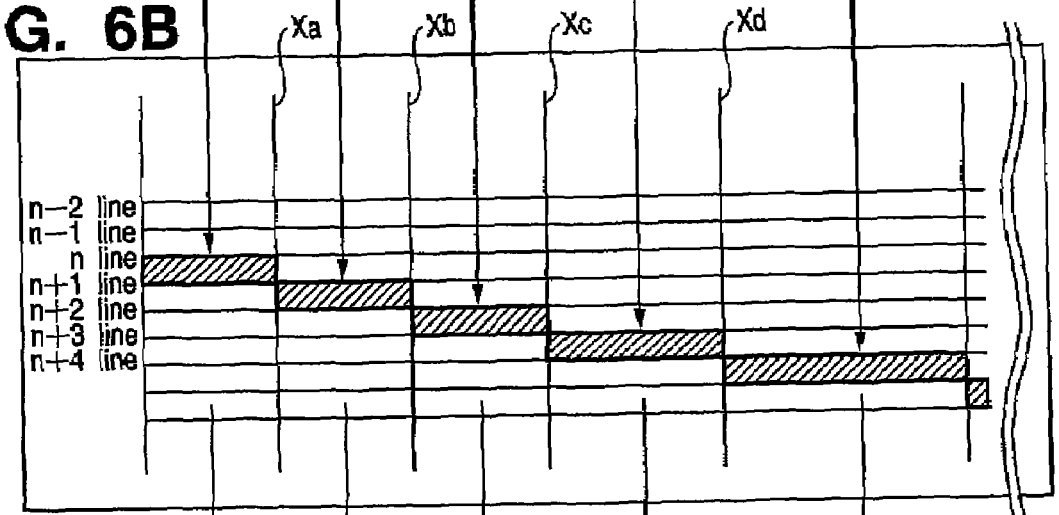
Figure 6C:
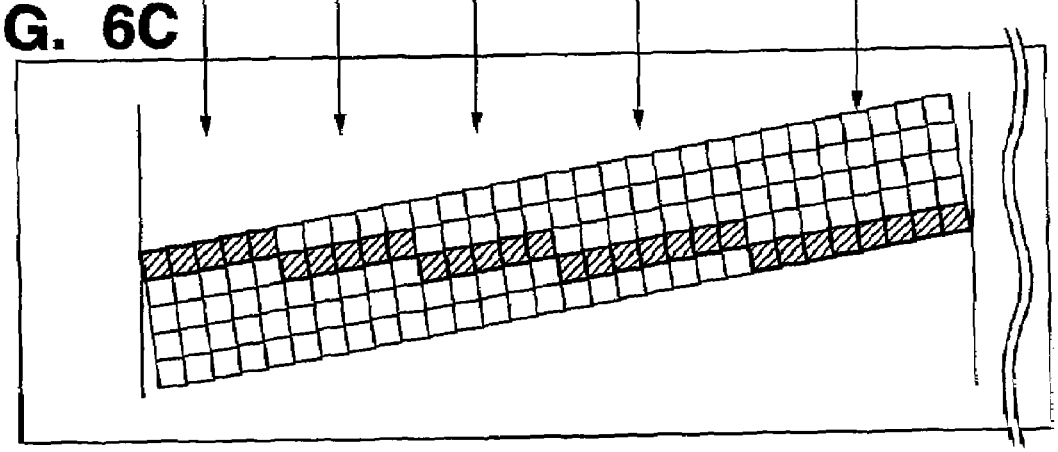

For example, as shown in FIG. 6B, if the coordinate in the sub-scan direction from the coordinate counter 801 is n, letting X be the coordinate in the main scan direction, the shifting amount of color compensation amount $\Delta y$ in a region 601 satisfies $0 \leq \Delta y < 1$. Hence, upon reconstructing data of the n-th line data, data of the n-th line is read out from the bitmap memory. In a region 602, the shifting amount of color compensation amount $\Delta y$ satisfies $1 \leq \Delta y < 2$. Hence, upon reconstructing data of the n-th line data, address conversion processing for reading out data from a position offset by one sub-scan line count, i.e., data of the (n+1)-th line from the bitmap memory 406 is executed. Likewise, address conversion processing for reading out data of the (n+2)-th line for a region 603 and that for reading out data of the (n+3)-th line for a region 604 are executed.

With the above method, the address conversion processing in the sub-scan direction in the pixel unit is done. An exposed image which is obtained by exposing image data which has undergone the shifting amount of color compensation by the address converter 802 is as shown in FIG. 6C.

Shifting amount of color compensation in less than the pixel unit in the color density converter 807 will be described below with reference to FIGS. 7A to 7F. The color density converter 807 compensates a shifting amount of color corresponding to the decimal part of the shifting amount of color compensation amount $\Delta y$ (shifting amount of color in less than the pixel unit). This compensation is implemented by adjusting the exposure ratios of neighboring dots in the sub-scan direction to distribute the pixel color density.

FIG. 7A shows an example (701) of a main scan line having a positive inclination (that in the Y-direction in FIG. 3). FIG. 7A illustrates a case wherein a shift of one dot occurs in the sub-scan direction each time the position advances four dots in the main scan direction. FIG. 7B shows a bitmap image 702 of a horizontal straight line before color density conversion. FIG. 7C shows a compensated bitmap image 703 when compensation for canceling shifting amount of color due to the inclination of the main scan line in FIG. 7A is applied. In order to realize such image 703, the exposure amounts of neighboring dots in the sub-scan direction must be adjusted.

FIG. 7D shows a relationship (compensation amount table) 704 between the shifting amount of color compensation amount $\Delta y$ and compensation coefficients used to perform color density conversion. In FIG. 7D, k is the integer part (obtained by truncating the decimal part) of the shifting amount of color compensation amount $\Delta y$, i.e., a compensation amount in the pixel unit in the sub-scan direction based on information of a fraction below the decimal point of the shifting amount of color compensation amount $\Delta y$. $\beta$ and $\alpha$ are compensation coefficients used to perform compensation in less than the pixel unit in the sub-scan direction, and indicate distribution ratios of the exposure amount to neighboring dots in the sub-scan direction. $\beta$ and $\alpha$ are respectively given by $\beta = \Delta y - k$ and $\alpha = 1 - \beta$. Note that a is the distribution ratio of the previous dot (a dot formed previously), and $\beta$ is that of the next dot (a dot formed later). In this manner, the pixel color densities of respective dots are distributed in the sub-scan direction based on the values of $\alpha$ and $\beta$.

FIG. 7E shows a bitmap image 705 which has undergone the color density conversion for adjusting the exposure ratios of neighboring dots in the sub-scan direction according to the compensation coefficients in FIG. 7D. FIG. 7F shows an exposed image 706 on the image carrier of the bitmap image that has undergone the color density conversion. In FIG. 7F, a horizontal straight line is formed since the inclination of the main scan line is canceled.

An example of the color density conversion processing shown in FIGS. 7A to 7F corresponds to a general image. By contrast, a case will be described below with reference to FIGS. 18A to 18F wherein a line formed to have a 1-dot width is to undergo color density conversion processing. Upon reproducing a line formed to have a 1-dot width by distributing the pixel color density to upper and lower dots, if 1 is obtained by combining the upper and lower dots, a color density for one dot cannot be expressed in terms of dot connection. Hence, as shown in FIGS. 18A to 18D, coefficients are preferably set to a total value slightly larger than 1 as a predetermined multiple of a pixel color density in a compensation amount table 1804. In case of FIGS. 18A to 18F, a total of upper and lower conversion amounts of the color density conversion is 1.2. In this manner, color density expression for one dot can be made.

In data of a pattern in which the on and off of dots are repeated in one-dot unit, when the color density conversion is applied to distribute the pixel color densities, an original pattern may disappear. To avoid such problem, as shown in FIGS. 19A to 19F, the coefficients α and β are respectively fixed to 1 and 0 in a compensation amount table 1905 so as not to distribute the color density, thus outputting original image data intact. As a result, deterioration of image quality due to conversion and compensation can be minimized.

The processing in the color density converter 807 has been described with reference to FIGS. 7A to 7F, FIGS. 18A to 18F, and FIGS. 19A to 19F. In the above description, there are three different compensation amount tables (704, 1804, and 1904). The compensation amount table to be used in the color density conversion processing can be determined based on a feature of image information extracted by the smoothing determination unit 806. The processing in the smoothing determination unit 806 will be described later with reference to FIG. 20.

The processing in the half-tone processor 808 in FIG. 8 will be described below. The half-tone processor 808 performs conversion processing (half-tone processing) for maintaining tone expression of an image while reducing the number of bits of input multi-valued image information. Appropriate image expression can be made by changing a cell size of halftoning in correspondence with the type of image information.

The order of the half-tone processing and shifting amount of color compensation processing to be applied to an input image influences image reproducibility. Examples of the processing results when an input image is processed in the order of half-tone processing→shifting amount of color compensation and when an input image is processed in the order of shifting amount of color compensation→half-tone processing will be described below with reference to FIGS. 9 and 10.

Figure 9:
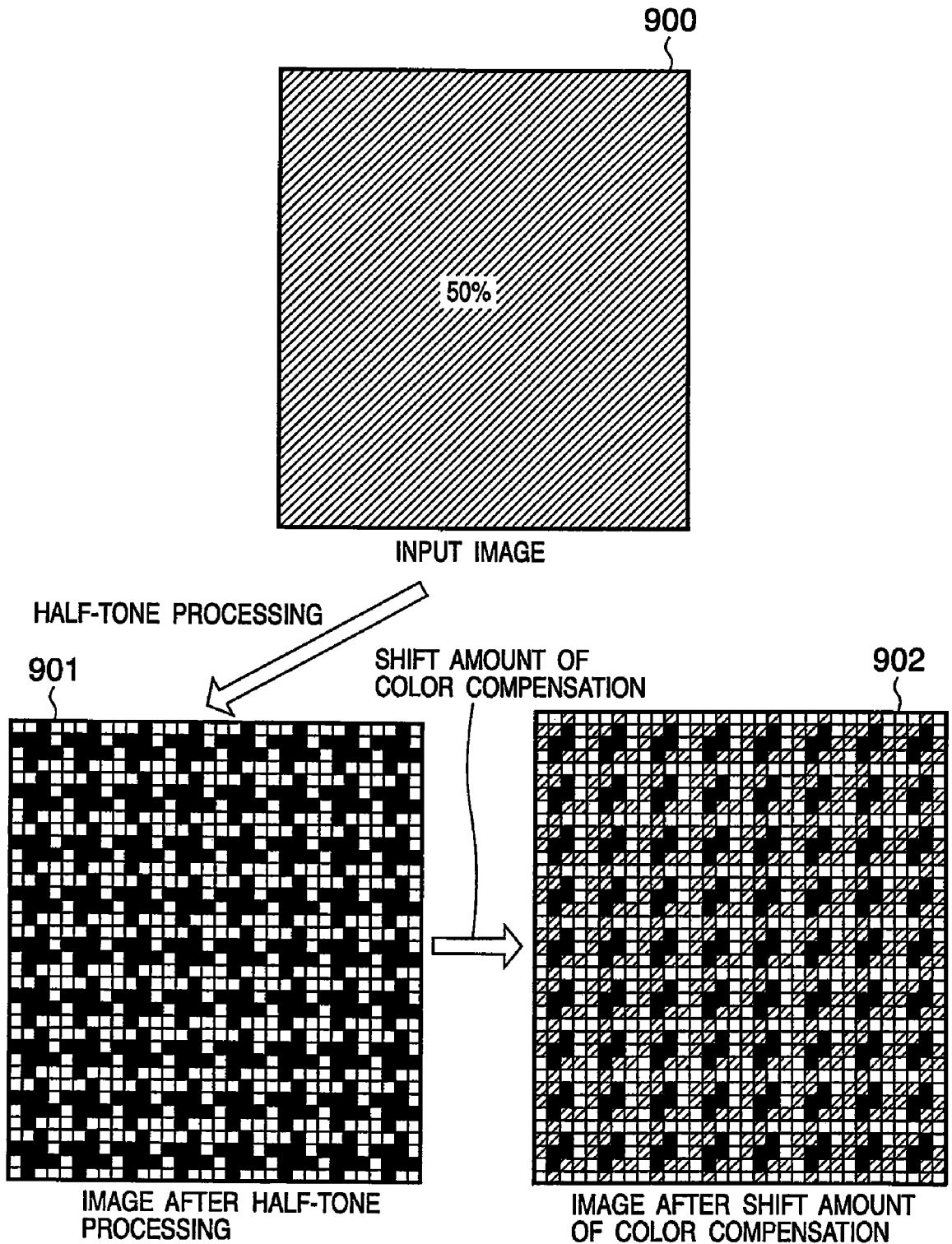
FIG. 9 is a view for explaining the result obtained when processing is applied to an input image in the order of half-tone processing and shifting amount of color compensation.

FIG. 9 shows an example obtained when an input image is processed in the order of half-tone processing→shifting amount of color compensation. In FIG. 9, reference numeral 900 denotes an input image having a constant color density=50%. When this image undergoes half-tone processing using a 4×4 half-tone pattern, an image 901 is obtained. This image 901 is an image which is to be originally obtained. Even after shifting amount of color compensation, if an image equivalent to this image is obtained, shifting amount of color compensation free from any image deterioration can be implemented. An image 902 is obtained when the image 901 after the half-tone processing undergoes ½ pixel shifting amount of color compensation in an upper direction (vertical direction) in FIG. 9. As can be seen from FIG. 9, when the shifting amount of color compensation is applied to the image after the half-tone processing, the reproducibility of half-tone dots of the half-tone image after the half-tone processing deteriorates.

Figure 10:
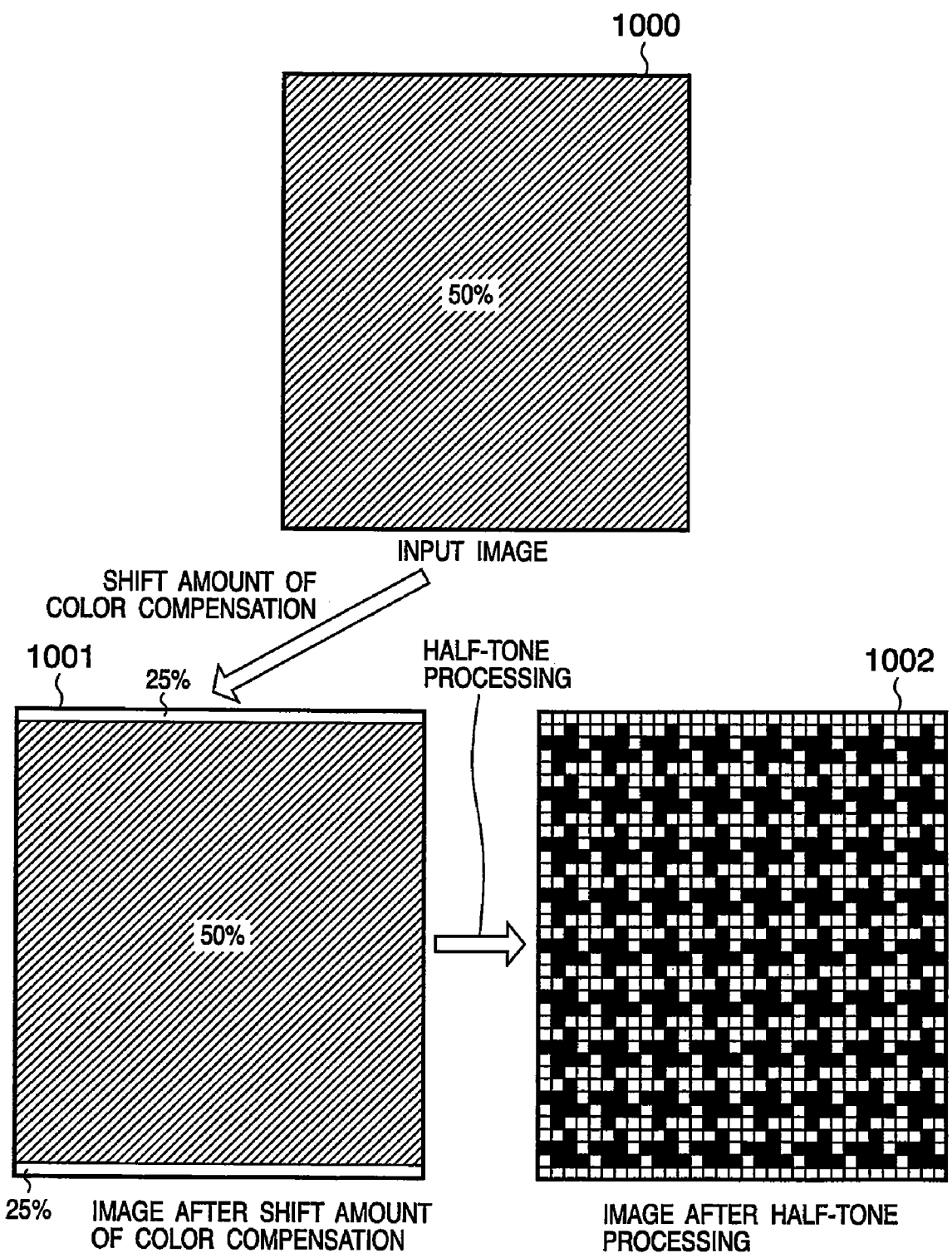
FIG. 10 is a view for explaining the result obtained when processing is applied to an input image in the order of shifting amount of color compensation and half-tone processing.

By contrast, FIG. 10 shows an example obtained when an input image is processed in the order of shifting amount of color compensation→half-tone processing. In FIG. 10, reference numeral 1000 denotes an input image which has a constant color density (50%) as in the aforementioned image 900. An image 1001 is obtained when the input image 1000 undergoes ½ pixel shifting amount of color compensation in an upper direction (vertical direction) in FIG. 10.

As a result of such shifting amount of color compensation, images of a color density=25% are generated in top and bottom line portions. An image 1002 is obtained as a result of half-tone processing which is applied to the image after the shifting amount of color correction. The image 1002 is different from the image 1000 since it includes images of a color density=25% in its top and bottom line portions. However, the remaining image is the same as the image 901, and no deterioration of half-tone dots of the half-tone image observed in the image 920 appears.

In this manner, by applying half-tone processing to an image having no edge such as the images 900 and 1000 after the shifting amount of color correction, image deterioration can be suppressed.

Figure 11:
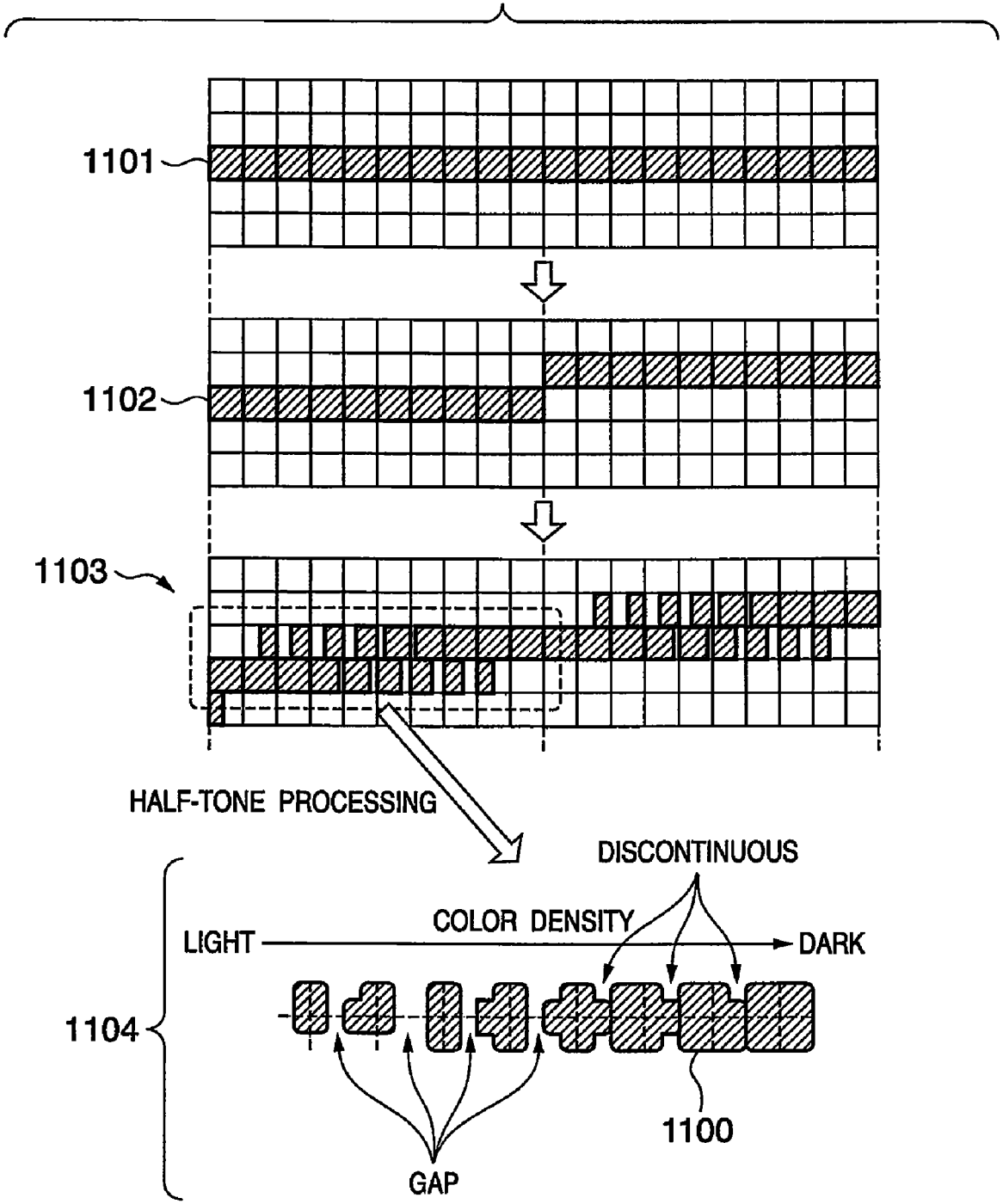
FIG. 11 is a view for explaining the result obtained when half-tone processing is applied to an edge image that has undergone shifting amount of color compensation.

On the other hand, the following problem is posed in an edge portion of an image such as a character, line image, or the like, whose color density changes abruptly with respect to surrounding color density values. For example, as shown in FIG. 11, when address conversion is applied to an input image 1101, a converted image 1102 is obtained. By contrast, when the color density conversion processing is applied to this image using a predetermined compensation amount table,. a converted image 1103 is obtained. When half-tone processing is applied to this image 1103, a processed image 1104 is obtained.

In the image 1104, since the edge portion is formed according to a half-tone pattern, the color density conversion result is invalidated, thus producing a gap and discontinuity in the edge portion. As a result, jaggy occurs in the image edge portion such as a character, line image, or the like. In addition, an image is disturbed depending on the feature of image information.

In order to prevent such poor results, the smoothing determination unit 806 must detect a feature of image information and must set the half-tone processor according to the detected feature in addition to the processing for determining the compensation amount table upon the color density conversion.

The processing of the smoothing determination unit 806 according to this embodiment will be described below.

Figure 20:
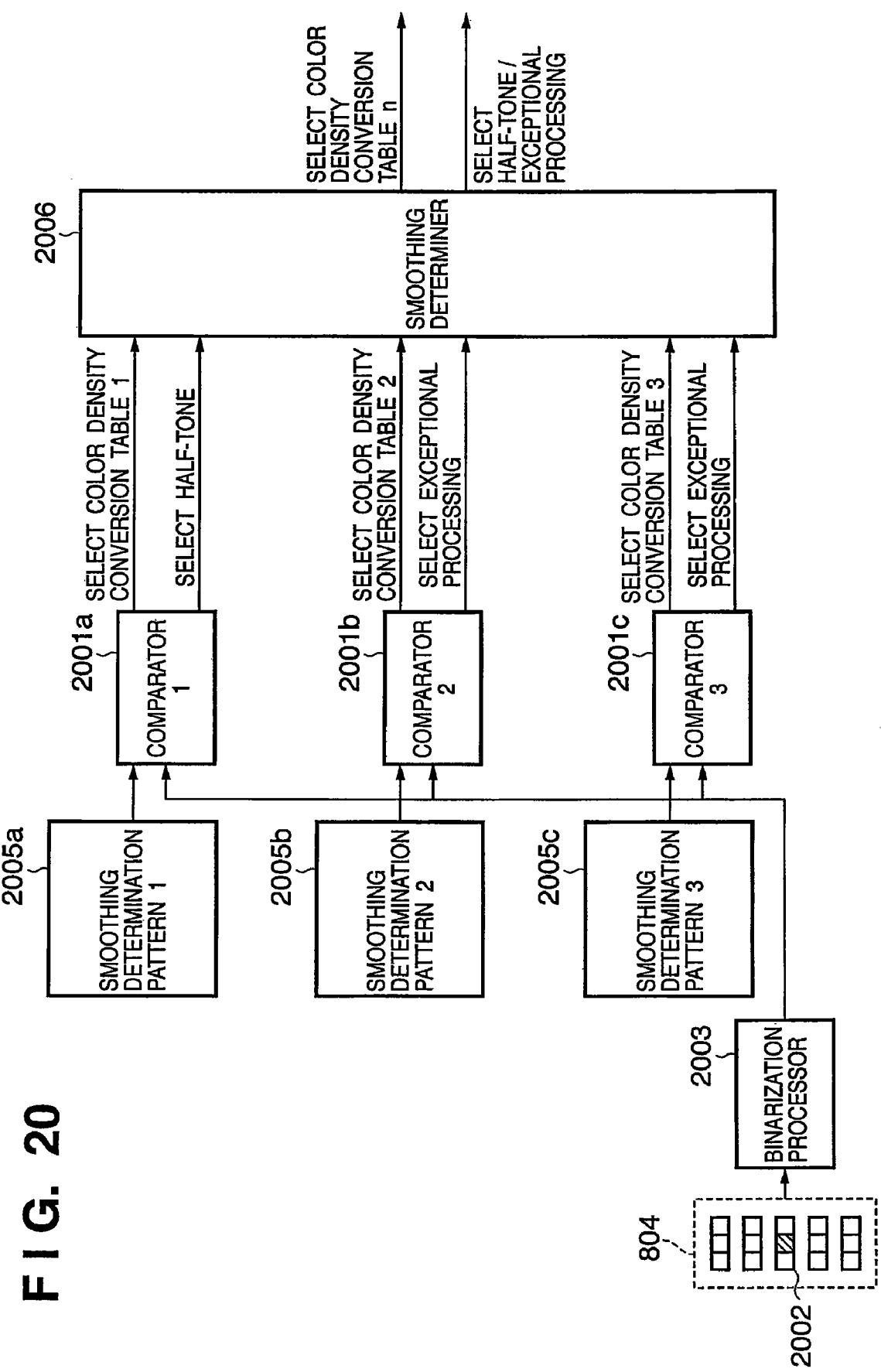
FIG. 20 is a block diagram showing an example of the arrangement of a smoothing determination unit according to the first embodiment of the present invention.

FIG. 20 is a block diagram showing an example of the detailed arrangement of the smoothing determination unit 806. Referring to FIG. 20, reference numerals 2001a to 2001c denote comparators, which compare predetermined smoothing patterns 2005a to 2005c stored in the smoothing determination pattern memory 805 with image data output from the line buffer 803. When the pattern matches, a compensation amount table and half-tone processing/exceptional processing corresponding to one of the comparators 2001a to 2001c are selected.

Reference numeral 2002 denotes a pixel of interest as a pixel to be processed. Pixels which are stored in a predetermined area to have this pixel of interest as the center are read out from the line buffer 803 as those which form the window 804.

Reference numeral 2003 denotes a binarization processor which converts multi-valued image data in the window 804, which are read out from the line buffer 803, into binary data. The method of binarizing image information includes a method of binarizing information based on an MSB, and a method of binarizing information by calculating an average value of neighboring pixels, and comparing the value of the pixel of interest with the average value. The binarization processing result is input to the comparators 2001a to 2001c.

Reference numerals 2005a to 2005c denote smoothing determination patterns read out from the smoothing determination pattern memory. These smoothing determination patterns are input to the comparators 2001a to 2001c and are compared with the binary image data.

FIGS. 24A to 24C show examples of the smoothing determination patterns. In FIGS. 24A to 24C, 3×3 patterns will be exemplified as the smoothing determination patterns. Even when the window size is 3×5, whether or not a pattern which matches the 3×3 pattern exists to have the pixel 2002 of interest as the center can be determined.

In FIGS. 24A to 24C, FIG. 24A shows examples of patterns in which a 2-dot wide or more line including the pixel 2002 of interest is formed. When the comparator 2001a detects an input pattern which matches such smoothing determination pattern in the data that has undergone the binarization processing, for example, the compensation amount table 704 shown in FIG. 7D is selected as that used on color density conversion. Also, of the half-tone processing and exceptional processing, the half-tone processing is selected.

FIG. 24B shows examples of patterns in which a 1-dot wide line including the pixel 2002 of interest is formed. When the comparator 2001b detects an input pattern which matches such smoothing determination pattern in the data that has undergone the binarization processing, for example, the compensation amount table 1804 shown in FIG. 18D is selected as that used on color density conversion. Also, of the half-tone processing and exceptional processing, the exceptional processing is selected. The exceptional processing in this case includes, e.g., the following processing. Primarily, a principal purpose of the half-tone processing is to adjust the bit width to be processed by a PWM unit later to that of input data while maintaining the tone characteristics of an image as much as possible. Hence, as the exceptional processing, the processing for setting the color density conversion ratio by the color density converter 807 to be equal to that of the bit width input to the PWM unit by multiplying a PWM maximum value by, e.g., bit slice processing, can be executed without executing any half-tone processing.

Furthermore, FIG. 24C shows examples of patterns in which pixels in the window 804 form a predetermined pattern. When the comparator 2001c detects an input pattern which matches such smoothing determination pattern in the data that has undergone the binarization processing, for example, the compensation amount table 1904 shown in FIG. 19D is selected as that used on color density conversion. Of the half-tone processing and exceptional processing, the exceptional processing is also selected in such case.

Reference numeral 2006 denotes a smoothing determiner, which outputs a predetermined compensation amount table to the color density converter 807 in accordance with the outputs from the comparators 2001 and also outputs a selection signal indicating one of the half-tone processing and exceptional processing to be selected to the selector 810. When none of the comparators 2001 detect matching with any of the smoothing determination patterns, the compensation amount table shown in FIG. 19D and half-tone processing are selected.

With the above processing, image data after the shifting amount of color compensation output from the shifting amount of color compensation unit 408C is PWM-modulated by a PWM processor 411C via the transfer buffer 410C. After that, the image data is supplied to the exposure unit 51-C to expose the photosensitive drum. As a result, an electrostatic latent image can be generated on the photosensitive drum 14.

As described above, according to the image forming apparatus of this embodiment, the color density conversion processing can be executed by selecting a compensation amount table and whether or not half-tone processing is to be executed can be selected and executed according to the feature of an image. In this manner, an image which suffers less deterioration of image quality can be provided, and processing can be executed at high speed.

More specifically, according to the present invention, a shifting amount of color compensation amount is calculated based on the shifting amount of color obtained from the shifting amount of color storage unit for each image forming unit, and address conversion is performed using the calculation result, thus attaining shifting amount of color compensation in the pixel unit. A feature of an image to be processed is detected, and color density conversion compensation for compensating for shifting amount of color in less than the pixel unit can be done. Furthermore, the half-tone processing or exceptional processing can be selectively executed according to the detected feature. In this way, color images are output to positions where registration errors caused by mechanical layout displacements and the like of optical scanning systems are canceled, and the layout can be corrected based on a value smaller than the minimum coordinate unit in the main scan direction. Therefore, a color image free from any shifting amount of color can be output at high speed without any deterioration.

Furthermore, by adopting an arrangement which commonizes the calculation processing of a compensation amount in consideration of the characteristics of the engine, the development efficiency can be improved, thus reducing the total cost.

Second Embodiment

The second embodiment will be described below. In the first embodiment, the processing in the color density converter 807 has been described with reference to FIGS. 7A to 7F, FIGS. 18A to 18F, and FIGS. 19A to 19F. In the above description, there are three different compensation amount tables (704, 1804, and 1904). The compensation amount table to be used in the color density conversion processing can be determined based on a feature of image information extracted by the smoothing determination unit 806. The processing in the smoothing determination unit 806 will be described below with reference to FIG. 25.

Figure 25:
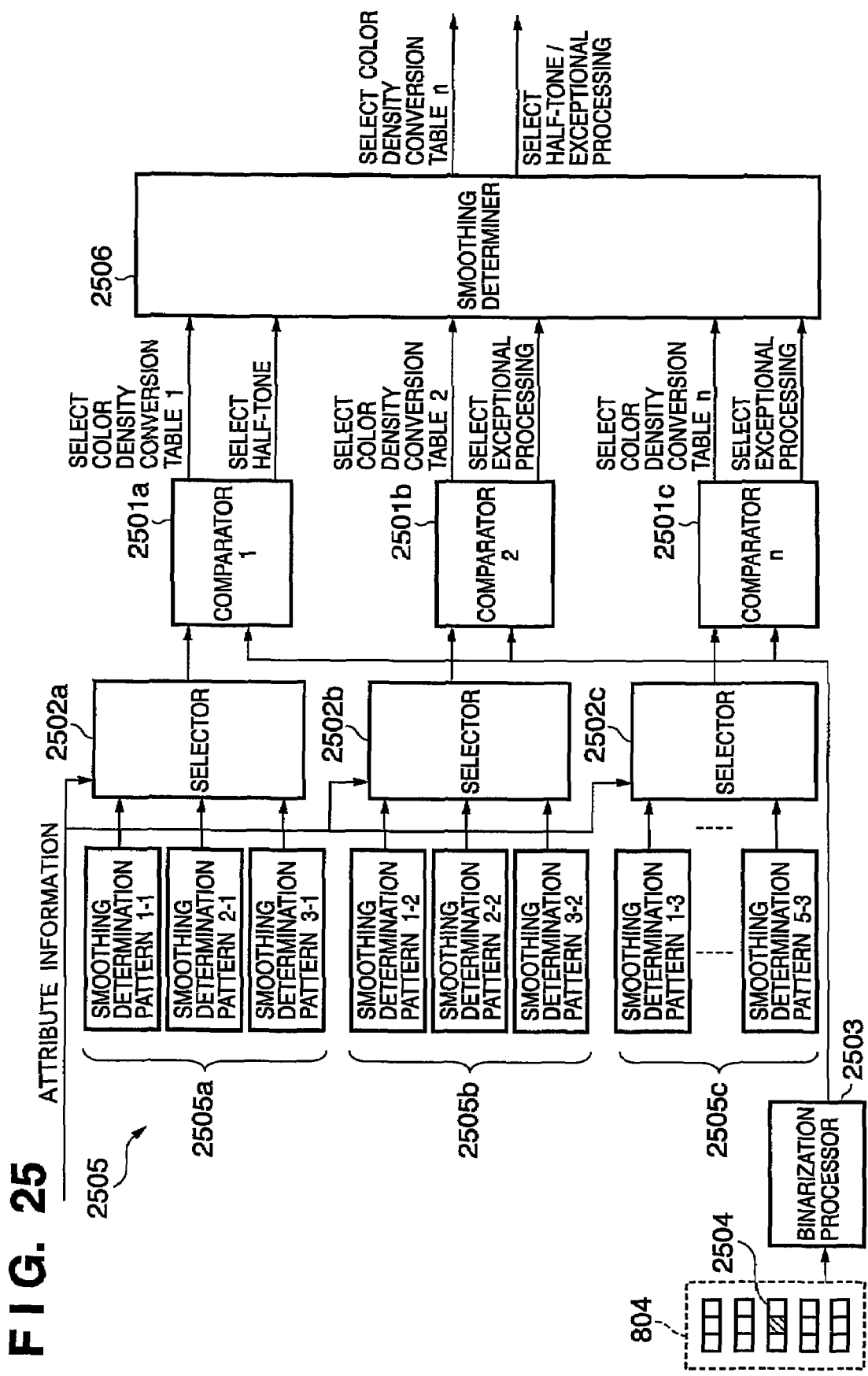
FIG. 25 is a block diagram showing an example of the arrangement of a smoothing determination unit according to the second embodiment of the present invention.

FIG. 25 is a block diagram showing an example of the detailed arrangement of the smoothing determination unit 806 according to this embodiment. Referring to FIG. 25, reference numerals 2501a to 2501c denote comparators, which compare predetermined smoothing patterns 2505a to 2505c stored in the smoothing determination pattern memory 805 with image data output from the line buffer 803. When the pattern matches, a compensation amount table and half-tone processing/exceptional processing corresponding to one of the comparators 2501a to 2501c are selected.

Reference numerals 2502a to 2502c denote selectors. The selectors 2502a to 2502c receive attribute information from the bitmap memory 406, and only the selector which receives the corresponding attribute information is enabled. Note that the attribute information includes information representing one of "natural image", "text", and "figure".

Reference numeral 2503 denotes a binarization processor which converts multi-valued image data in the window 804, which are read out from the line buffer 803, into binary data. The method of binarizing image information includes a method of binarizing information based on an MSB, and a method of binarizing information by calculating an average value of neighboring pixels, and comparing the value of the pixel of interest with the average value. The binarization processing result is input to the comparators 2501a to 2501c.

Reference numeral 2504 denotes a pixel of interest as a pixel to be processed. Pixels which are stored in a predetermined area to have this pixel of interest as the center are read out from the line buffer 803 as those which form the window 804.

Reference numerals 2505a to 2505c denote smoothing determination patterns which are read out from the smoothing determination pattern memory and correspond to the selectors 2502a to 2502c.

Figure 26A:
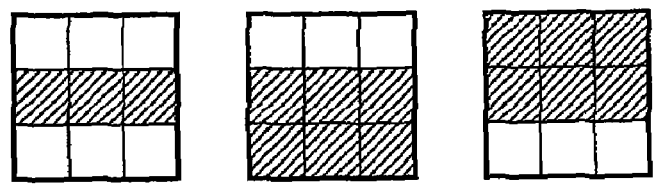
FIGS. 26A to 26C are views for explaining an example of a smoothing determination pattern according to the third embodiment of the present invention.
Figure 26B:
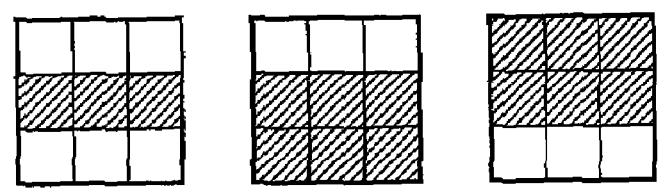
Figure 26C:
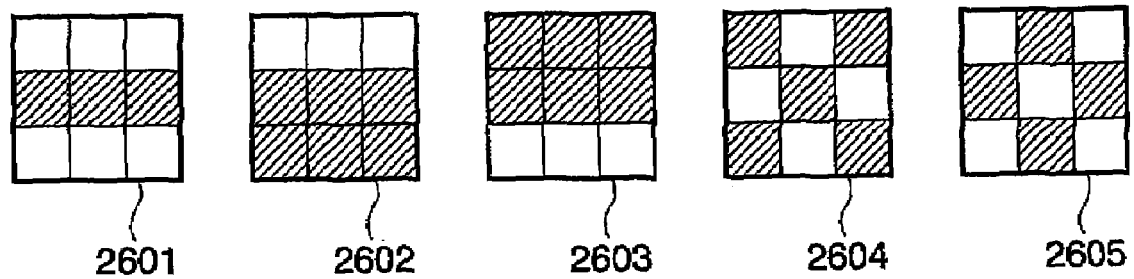

FIGS. 26A to 26C show examples of the smoothing determination patterns. In FIGS. 26A to 26C, 3×3 patterns will be exemplified as the smoothing determination patterns. Even when the window size is 3×5, whether or not a pattern which matches the 3×3 pattern exists to have the pixel 2504 of interest as the center can be determined. FIG. 26A shows examples of patterns to be applied when input image data is a natural image. FIG. 26B shows examples of patterns when input image data is a text image. Furthermore, FIG. 26C shows examples of patterns when input image data is a figure.

In this embodiment, the selector 2502a is enabled when the attribute information indicates a natural image. The smoothing determination patterns shown in FIG. 26A are input to the selector 2502a, and are output to the comparator 2501a in turn. When the comparator 2501a detects an input pattern which matches the input smoothing determination pattern in the data that has undergone the binarization processing, for example, the compensation amount table 704 shown in FIG. 7D is selected as that used on color density conversion. Also, of the half-tone processing and exceptional processing, the half-tone processing is selected.

Next, the selector 2502b is enabled when the attribute information indicates text. The smoothing determination patterns shown in FIG. 26B are input to the selector 2502b, and are output to the comparator 2501b in turn. When the comparator 2501b detects an input pattern which matches the input smoothing determination pattern in the data that has undergone the binarization processing, for example, the compensation amount table 1804 shown in FIG. 18D is selected as that used on color density conversion. Also, of the half-tone processing and exceptional processing, the exceptional processing is selected. The exceptional processing in this case includes, e.g., the following processing. Primarily, a principal purpose of the half-tone processing is to adjust the bit width to be processed by a PWM unit later to that of input data while maintaining the tone characteristics of an image as much as possible. Hence, as the exceptional processing, the processing for setting the color density conversion ratio by the color density converter 807 to be equal to that of the bit width input to the PWM unit by multiplying a PWM maximum value by, e.g., bit slice processing, can be executed without executing any half-tone processing.

Furthermore, the selector 2502c is enabled when the attribute information indicates text. The smoothing determination patterns shown in FIG. 26C are input to the selector 2502c, and are output to the comparator 2501c in turn. When the comparator 2501c detects an input pattern which matches the input smoothing determination pattern in the data that has undergone the binarization processing, for example, the compensation amount table 704 or 1904 shown in FIG. 7D or 19D is selected as that used on color density conversion. At this time, when a pattern matches one of the patterns 2601 to 2603 in FIG. 26C, the table shown in FIG. 7D is selected. On the other hand, when a pattern matches one of the patterns 2604 to 2605 in FIG. 26C, the table shown in FIG. 19D is selected. Of the half-tone processing and exceptional processing, the exceptional processing is also selected in this case.

Reference numeral 2506 denotes a smoothing determiner, which outputs a predetermined compensation amount table to the color density converter 807 in accordance with the outputs from the comparators 2501, and also outputs a selection signal indicating one of the half-tone processing and exceptional processing to be selected to the selector 810. When none of the comparators 2501 detect matching with any of the smoothing determination patterns, the compensation amount table shown in FIG. 19D and half-tone processing are selected.

With the above processing, image data after the shifting amount of color compensation output from the shifting amount of color compensation unit 408C is PWM-modulated by the PWM processor 411C via the transfer buffer 410C. After that, the image data is supplied to the exposure unit 51-C to expose the photosensitive drum. As a result, an electrostatic latent image can be generated on the photosensitive drum 14.

As described above, according to the image forming apparatus of this embodiment, the color density conversion processing can be executed by selecting a compensation amount table and whether or not half-tone processing is to be executed can be selected and executed according to the feature of an image. In this manner, an image which suffers less deterioration of image quality can be provided, and processing can be executed at high speed using attribute information of an image.

More specifically, according to the present invention, a shifting amount of color compensation amount is calculated based on the shifting amount of color obtained from the shifting amount of color storage unit for each image forming unit, and address conversion is performed using the calculation result, thus attaining shifting amount of color compensation in the pixel unit. A feature of an image to be processed is detected, and color density conversion compensation for compensating for shifting amount of color in less than the pixel unit can be done. Furthermore, the half-tone processing or exceptional processing can be selectively executed according to the detected feature. In this way, color images are output to positions where registration errors caused by mechanical layout displacements and the like of optical scanning systems are canceled, and the layout can be corrected based on a value smaller than the minimum coordinate unit in the main scan direction. Therefore, a color image free from any shifting amount of color can be output at high speed without any deterioration.

Furthermore, by adopting an arrangement which commonizes the calculation processing of a compensation amount in consideration of the characteristics of the engine, the development efficiency can be improved, thus reducing the total cost.

Third Embodiment

In the first and second embodiments, after color conversion by the color conversion unit 405, image data is temporarily stored in the bitmap memory 406, and then undergoes address conversion in the shifting amount of color compensation unit 408. By contrast, this embodiment will explain a case wherein the address conversion is made when image data is mapped on the bitmap memory.

Figure 21:
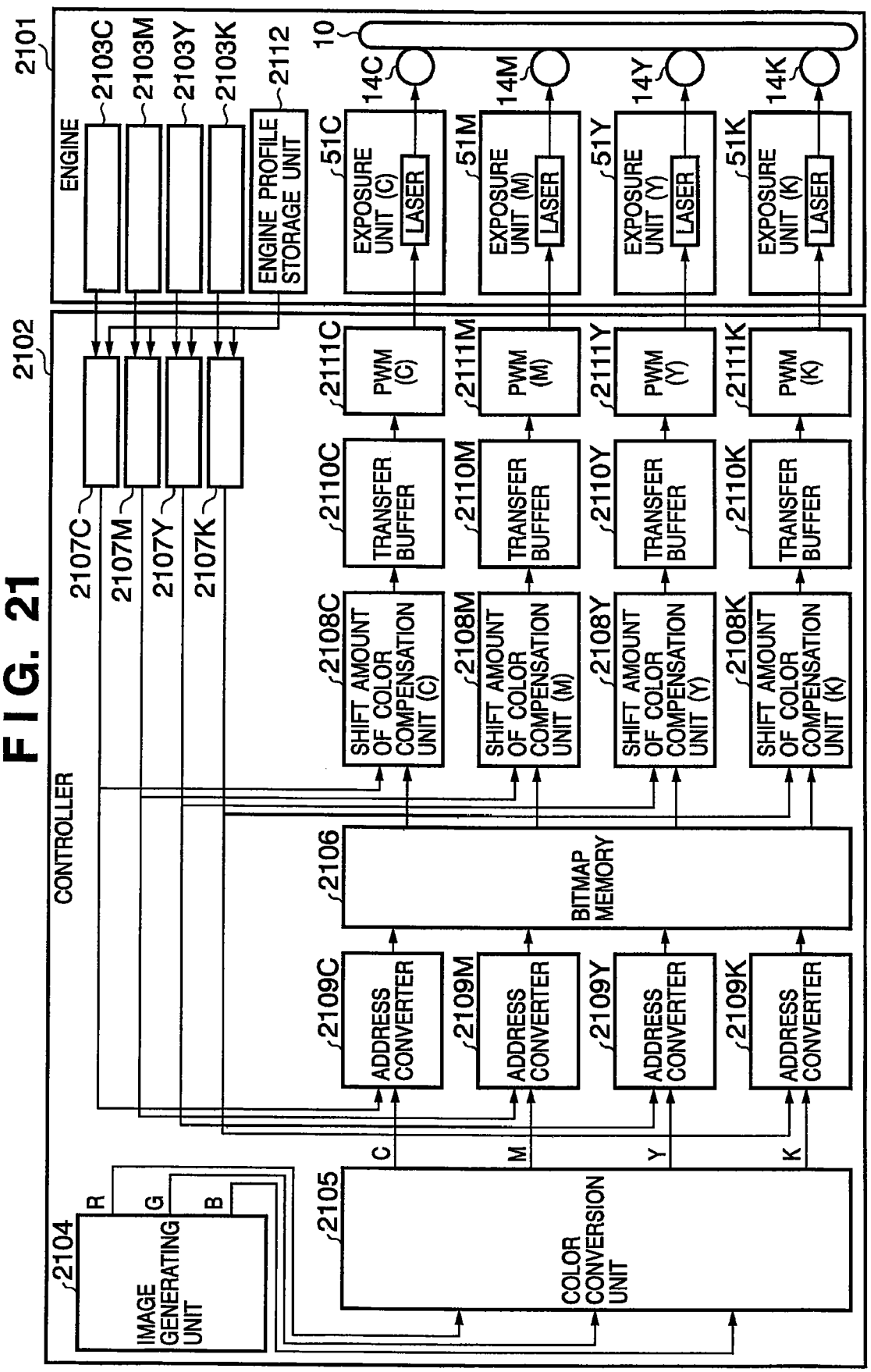
FIG. 21 is a schematic block diagram showing the arrangement of a controller and engine of an image forming apparatus according to the third embodiment of the present invention.

FIG. 21 is a block diagram showing an example of the arrangement of a printer engine and controller of an image forming apparatus according to this embodiment. The arrangement shown in FIG. 21 is substantially the same as that in FIG. 1, except that address converters 2109 are arranged before a bitmap memory 2106.

Each address converter 2109 executes compensation processing of the integer part of the compensation amount $\Delta y$, i.e., reconstruction processing in the pixel unit in the sub-scan direction, based on the table data 1609 (corresponding to the compensation amount $\Delta y$) obtained from the shifting amount of color calculator 407C, as in the description using FIG. 8, and writes the processing result in the bitmap memory 2106.

FIGS. 23A to 23F show a state wherein data is written in the bitmap memory 2106 at that time. As described above, according to this embodiment, when data is written in the bitmap memory 2106, compensation processing of the integer part of the compensation amount $\Delta y$ in the sub-scan direction is completed. Therefore, a shifting amount of color compensation unit 2108C performs color density conversion and the like based on the shifting amount of color of the decimal part of the compensation amount $\Delta y$.

Figure 22:
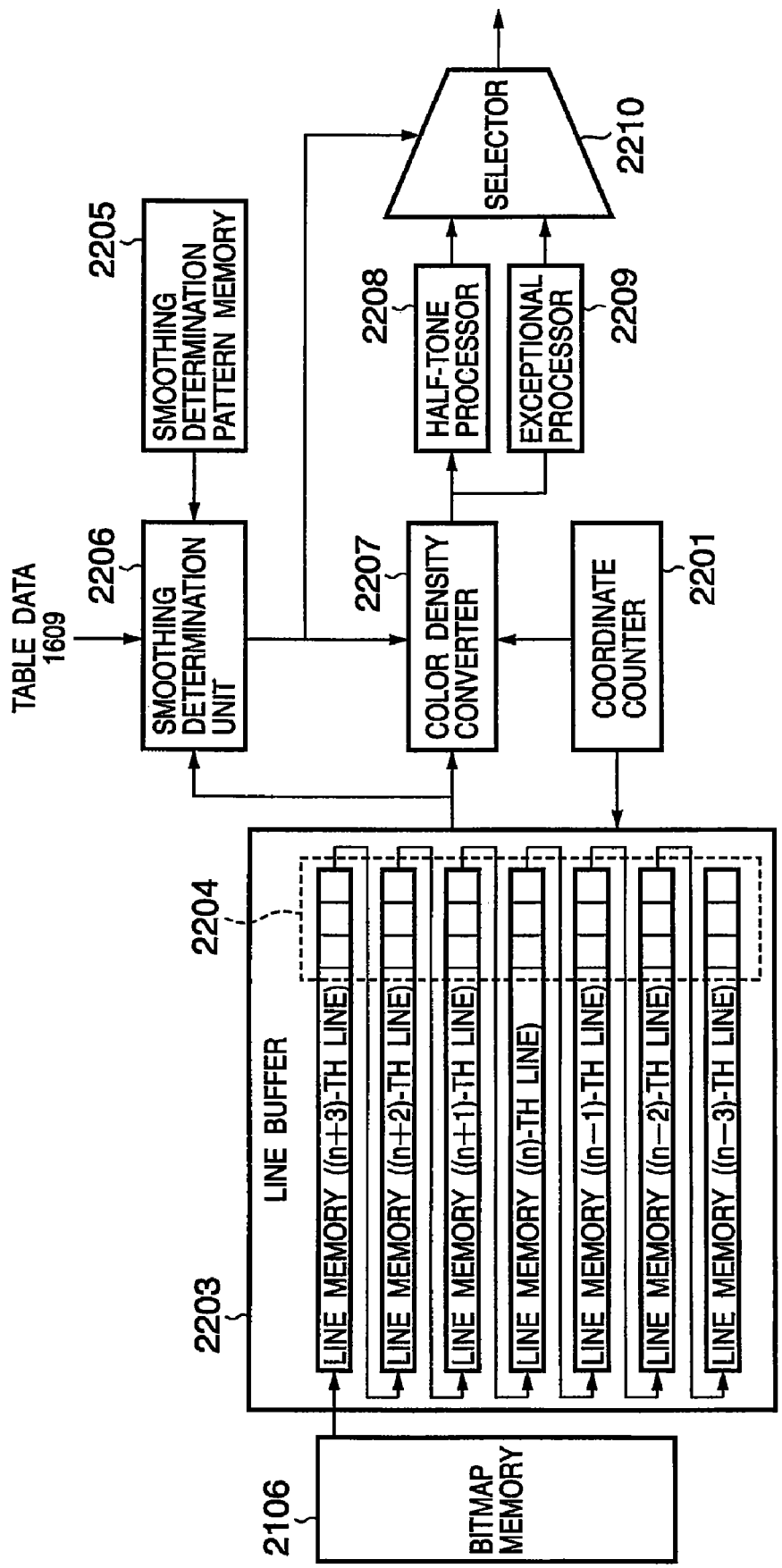
FIG. 22 is a block diagram showing an example of the arrangement of a shifting amount of color compensation unit according to the third embodiment of the present invention.

FIG. 22 shows the detailed arrangement of the shifting amount of color compensation unit 2108C. Referring to FIG. 22, a line buffer 2203 has a capacity for seven lines. However, the present invention is not limited to such specific number of lines. More specifically, a minimum number of line memories used in the line buffer 2203 is given by the number of lines of a window used in the smoothing determination processing+2 (in FIG. 22, 5+2=7).

In this embodiment, when image data is loaded onto the line buffer 2203, the shifting amount of color corresponding to the integer part of the compensation amount $\Delta y$ is reflected. Hence, upon executing comparison processing with smoothing determination patterns in a smoothing determination unit 2206, the shape of the window must be deformed in correspondence with the shifting amount of color corresponding to the integer part to cancel the shifting amount of color. For example, a case will be examined below wherein a shift of one dot occurs in the sub-scan direction as the inclination of the main scan line in this embodiment each time a position advances four dots in the main scan direction, as indicated by 2301 in FIGS. 23A to 23F. In this case, a window which considers the shifting amount of color is set as that including a shift of one dot in the sub-scan direction. That is, in an image 2302 in FIGS. 23A to 23F, the window is set like a region bounded by a dotted line 2308. On the other hand, as for a region that does not include any displacement in the sub-scan direction, a window 2307 is set as per normal.

Since the subsequent processes are the same as those in FIG. 8, a detailed description thereof will be omitted.

As described above, in this embodiment, when image data after color conversion is written in the bitmap memory, some steps of the compensation processing in the sub-scan direction can be executed, and the color density conversion processing can then be executed.

Other Embodiments

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

This application claims the benefit of Japanese Application Nos. 2005-118983, filed on Apr. 15, 2005, and 2005-118984, filed on Apr. 15, 2005, which are hereby incorporated by reference herein in their entirety.

What is claimed is:

1. An image forming apparatus having an image forming unit which includes an image carrier, an exposure unit used to expose the image carrier, and a developing unit used to visualize an electrostatic latent image generated by exposure using a printing medium, comprising:

a shifting amount of color storage unit adapted to store information of shifting amount of color that represents a shifting amount of color of an exposure position in a sub-scan direction upon exposing the image carrier while scanning the image carrier in a main scan direction;

a shifting amount of color compensation amount calculator adapted to calculate a shifting amount of color compensation amount required to compensate the shifting amount of color in the sub-scan direction based on the shifting amount of color;

an image data storage unit adapted to store image data formed by a plurality of pixels;

an address converter adapted to convert a coordinate of a read address of said image data storage unit based on a shifting amount of color in a pixel unit of the shifting amount of color compensation amount, and to read out pixel data of a pixel of interest from said image data storage unit in accordance with the converted address information;

a pixel color density converter adapted to convert a pixel color density of the pixel data read out from said image data storage unit by said address converter based on a shifting amount of color less than a pixel unit of the shifting amount of color compensation amount;

a half-tone processing unit adapted to perform half-tone processing of the pixel data which has undergone the color density conversion by said pixel color density converter;

an exceptional processing unit adapted to perform exceptional processing of the pixel data which has undergone the color density conversion by said pixel color density converter;

a process determination unit adapted to detect a feature of image data formed by pixels in a predetermined region having the pixel of interest as a center of the image data stored in said image data storage unit, and to determine one of the exceptional processing and the half-tone processing to be selected; and an output unit adapted to select a processing result of one of said exceptional processing unit and said half-tone processing unit based on a determination result of said process determination unit, and to output the selected processing result as an exposure control signal of the exposure unit.

2. An image forming apparatus having an image forming unit which includes an image carrier, an exposure unit used to expose the image carrier, and a developing unit used to visualize an electrostatic latent image generated by exposure using a printing medium, comprising:

a shifting amount of color storage unit adapted to store information of shifting amount of color that represents a shifting amount of color of an exposure position in a sub-scan direction upon exposing the image carrier while scanning the image carrier in a main scan direction;

a shifting amount of color compensation amount calculator adapted to calculate a shifting amount of color compensation amount required to compensate the shifting amount of color in the sub-scan direction based on the shifting amount of color;

a first image data storage unit adapted to store image data formed by a plurality of pixels;

an address converter adapted to convert a coordinate of a read address of said first image data storage unit based on a shifting amount of color in a pixel unit of the shifting amount of color compensation amount, to read out image data from said first image data storage unit in accordance with the converted address information, and to store the read-out image data in a second image data storage unit;

a pixel color density converter adapted to read out pixel data of a pixel of interest from the second image data storage unit, and convert a pixel color density of the pixel data based on a shifting amount of color less than a pixel unit of the shifting amount of color compensation amount;

a half-tone processing unit adapted to perform half-tone processing of the pixel data which has undergone the color density conversion by said pixel color density converter;

an exceptional processing unit adapted to perform exceptional processing of the pixel data which has undergone the color density conversion by said pixel color density converter;

a process determination unit adapted to detect a feature of image data formed by pixels in a predetermined region having the pixel of interest as a center of the image data stored in the second image data storage unit, and to determine one of the exceptional processing and the half-tone processing to be selected; and an output unit adapted to select a processing result of one of said exceptional processing unit and said half-tone processing unit based on a determination result of said process determination unit, and to output the selected processing result as an exposure control signal of the exposure unit, and wherein the predetermined region is set to cancel conversion of the address based on the shifting amount of color in the pixel unit by said address converter.

3. An image forming apparatus having an image forming unit which includes an image carrier, an exposure unit used to expose the image carrier, and a developing unit used to visualize an electrostatic latent image generated by exposure using a printing medium, comprising:

a shifting amount of color storage unit adapted to store information of shifting amount of color that represents a shifting amount of color of an exposure position in a sub-scan direction upon exposing the image carrier while scanning the image carrier in a main scan direction;

a shifting amount of color compensation amount calculator adapted to calculate a shifting amount of color compensation amount required to compensate the shifting amount of color in the sub-scan direction based on the shifting amount of color;

an image data storage unit adapted to store image data formed by a plurality of pixels;

an address converter adapted to convert a coordinate of a read address of said image data storage unit based on a shifting amount of color in a pixel unit of the shifting amount of color compensation amount, and to read out pixel data of a pixel of interest from said image data storage unit in accordance with the converted address information;

a pixel color density converter adapted to convert a pixel color density of the pixel data read out from said image data storage unit by said address converter based on a shifting amount of color less than a pixel unit of the shifting amount of color compensation amount;

a half-tone processing unit adapted to perform half-tone processing of the pixel data which has undergone the color density conversion by said pixel color density converter;

an exceptional processing unit adapted to perform exceptional processing of the pixel data which has undergone the color density conversion by said pixel color density converter;

a process determination unit adapted to detect a feature of image data formed by pixels in a predetermined region having the pixel of interest as a center of the image data stored in said image data storage unit using attribute information that represents an attribute of the pixel data, and to determine one of the exceptional processing and the half-tone processing to be selected; and an output unit adapted to select a processing result of one of said exceptional processing unit and said half-tone processing unit based on a determination result of said process determination unit, and to output the selected processing result as an exposure control signal of the exposure unit.

4. An image forming apparatus having an image forming unit which includes an image carrier, an exposure unit used to expose the image carrier, and a developing unit used to visualize an electrostatic latent image generated by exposure using a printing medium, comprising:

a shifting amount of color storage unit adapted to store information of shifting amount of color that represents a shifting amount of color of an exposure position in a sub-scan direction upon exposing the image carrier while scanning the image carrier in a main scan direction;

a shifting amount of color compensation amount calculator adapted to calculate a shifting amount of color compensation amount required to compensate the shifting amount of color in the sub-scan direction based on the shifting amount of color;

a first image data storage unit adapted to store image data formed by a plurality of pixels;

an address converter adapted to convert a coordinate of a read address of said first image data storage unit based on a shifting amount of color in a pixel unit of the shifting amount of color compensation amount, to read out image data from said first image data storage unit in accordance with the converted address information, and to store the read-out image data in a second image data storage unit;

a pixel color density converter adapted to read out pixel data of a pixel of interest from the second image data storage unit, and to convert a pixel color density of the pixel data based on a shifting amount of color less than a pixel unit of the shifting amount of color compensation amount;

a half-tone processing unit adapted to perform half-tone processing of the pixel data which has undergone the color density conversion by said pixel color density converter;

an exceptional processing unit adapted to perform exceptional processing of the pixel data which has undergone the color density conversion by said pixel color density converter;

a process determination unit adapted to detect a feature of image data formed by pixels in a predetermined region having the pixel of interest as a center of the image data stored in the second image data storage unit using attribute information that represents an attribute of the pixel data, and to determine one of the exceptional processing and the half-tone processing to be selected; and an output unit adapted to select a processing result of one of said exceptional processing unit and said half-tone processing unit based on a determination result of said process determination unit, and to output the selected processing result as an exposure control signal of the exposure unit, and wherein the predetermined region is set to cancel conversion of the address based on the shifting amount of color in the pixel unit by said address converter.

5. The apparatus according to any one of claims 1 to 4, wherein said process determination unit further determines a coefficient used to convert the pixel color density based on the feature of the image data, and said pixel color density converter converts the pixel color density based on the shifting amount of color less than the pixel unit of the shifting amount of color compensation amount using the coefficient.

6. The apparatus according to claim 5, wherein the coefficient is used to distribute the pixel color density in the sub-scan direction.

7. The apparatus according to claim 5, wherein the coefficient is used to distribute a predetermined multiple of the pixel color density in the sub-scan direction.

8. The apparatus according to claim 5, wherein the coefficient is used not to distribute the pixel color density in the sub-scan direction.

9. The apparatus according to claim 1, wherein said process determination unit comprises a pattern image storage unit adapted to store a predetermined pattern image, and said process determination unit detects the feature by comparing the pattern image with image data formed by pixels in the predetermined region having the pixel of interest as the center.

10. The apparatus according to claim 3, wherein the attribute information includes information indicating one of attributes of a natural image, text, and figure.

11. A method of controlling an image forming apparatus having an image forming unit which includes an image carrier, an exposure unit used to expose the image carrier, and a developing unit used to visualize an electrostatic latent image generated by exposure using a printing medium, and comprising a shifting amount of color storage unit adapted to store information of shifting amount of color that represents a shifting amount of color of an exposure position in a sub-scan direction upon exposing the image carrier while scanning the image carrier in a main scan direction, comprising:

a shifting amount of color compensation amount calculating step of calculating a shifting amount of color compensation amount required to compensate the shifting amount of color in the sub-scan direction based on the shifting amount of color;

a storage step of storing image data formed by a plurality of pixels in an image data storage unit;

an address converting step of converting a coordinate of a read address of the image data storage unit based on a shifting amount of color in a pixel unit of the shifting amount of color compensation amount, and reading out pixel data of a pixel of interest from the image data storage unit in accordance with the converted address information;

a pixel color density converting step of converting a pixel color density of the pixel data read out from the image data storage unit in the address converting step based on a shifting amount of color less than a pixel unit of the shifting amount of color compensation amount;

a half-tone processing step of performing half-tone processing of the pixel data which has undergone the color density conversion in the pixel color density converting step;

an exceptional processing step of performing exceptional processing of the pixel data which has undergone the color density conversion in the pixel color density converting step;

a process determination step of detecting a feature of image data formed by pixels in a predetermined region having the pixel of interest as a center of the image data stored in the image data storage unit, and determining one of the exceptional processing and the half-tone processing to be selected; and an output step of selecting a processing result of one of the exceptional processing step and the half-tone processing step based on a determination result in the process determination step, and outputting the selected processing result as an exposure control signal of the exposure unit.

12. A method of controlling an image forming apparatus having an image forming unit which includes an image carrier, an exposure unit used to expose the image carrier, and a developing unit used to visualize an electrostatic latent image generated by exposure using a printing medium, and comprising a shifting amount of color storage unit adapted to store information of shifting amount of color that represents a shifting amount of color of an exposure position in a sub-scan direction upon exposing the image carrier while scanning the image carrier in a main scan direction, comprising:

a shifting amount of color compensation amount calculating step of calculating a shifting amount of color compensation amount required to compensate the shifting amount of color in the sub-scan direction based on the shifting amount of color;

a storage step of storing image data formed by a plurality of pixels in a first image data storage unit;

an address converting step of converting a coordinate of a read address of the first image data storage unit based on a shifting amount of color in a pixel unit of the shifting amount of color compensation amount, reading out image data from the first image data storage unit in accordance with the converted address information, and storing the read-out image data in a second image data storage unit;

a pixel color density converting step of reading out pixel data of a pixel of interest from the second image data storage unit, and converting a pixel color density of the pixel data based on a shifting amount of color less than a pixel unit of the shifting amount of color compensation amount;

a half-tone processing step of performing half-tone processing of the pixel data which has undergone the color density conversion in the pixel color density converting step;

an exceptional processing step of performing exceptional processing of the pixel data which has undergone the color density conversion in the pixel color density converting step;

a process determination step of detecting a feature of image data formed by pixels in a predetermined region having the pixel of interest as a center of the image data stored in the second image data storage unit, and determining one of the exceptional processing and the half-tone processing to be selected; and an output step of selecting a processing result of one of the exceptional processing step and the half-tone processing step based on a determination result in the process determination step, and outputting the selected processing result as an exposure control signal of the exposure unit, and wherein the predetermined region is set to cancel conversion of the address based on the shifting amount of color in the pixel unit in the address converting step.

13. A method of controlling an image forming apparatus having an image forming unit which includes an image carrier, an exposure unit used to expose the image carrier, and a developing unit used to visualize an electrostatic latent image generated by exposure using a printing medium, and comprising a shifting amount of color storage unit adapted to store information of shifting amount of color that represents a shifting amount of color of an exposure position in a sub-scan direction upon exposing the image carrier while scanning the image carrier in a main scan direction, comprising:

a shifting amount of color compensation amount calculating step of calculating a shifting amount of color compensation amount required to compensate the shifting amount of color in the sub-scan direction based on the shifting amount of color;

a storage step of storing image data formed by a plurality of pixels in an image data storage unit;

an address converting step of converting a coordinate of a read address of the image data storage unit based on a shifting amount of color in a pixel unit of the shifting amount of color compensation amount, and reading out pixel data of a pixel of interest from the image data storage unit in accordance with the converted address information;

a pixel color density converting step of converting a pixel color density of the pixel data read out from the image data storage unit in the address converting step based on a shifting amount of color less than a pixel unit of the shifting amount of color compensation amount;

a half-tone processing step of performing half-tone processing of the pixel data which has undergone the color density conversion in the pixel color density converting step;

an exceptional processing step of performing exceptional processing of the pixel data which has undergone the color density conversion in the pixel color density converting step;

a process determination step of detecting a feature of image data formed by pixels in a predetermined region having the pixel of interest as a center of the image data stored in the image data storage unit using attribute information that represents an attribute of the pixel data, and determining one of the exceptional processing and the half-tone processing to be selected; and an output step of selecting a processing result of one of the exceptional processing step and the half-tone processing step based on a determination result in the process determination step, and outputting the selected processing result as an exposure control signal of the exposure unit.

14. A method of controlling an image forming apparatus having an image forming unit which includes an image carrier, an exposure unit used to expose the image carrier, and a developing unit used to visualize an electrostatic latent image generated by exposure using a printing medium, and comprising a shifting amount of color storage unit adapted to store information of shifting amount of color that represents a shifting amount of color of an exposure position in a sub-scan direction upon exposing the image carrier while scanning the image carrier in a main scan direction, comprising:
- a shifting amount of color compensation amount calculating step of calculating a shifting amount of color compensation amount required to compensate the shifting amount of color in the sub-scan direction based on the shifting amount of color;
- a storage step of storing image data formed by a plurality of pixels in a first image data storage unit;
- an address converting step of converting a coordinate of a read address of the first image data storage unit based on a shifting amount of color in a pixel unit of the shifting amount of color compensation amount, reading out image data from the first image data storage unit in accordance with the converted address information, and storing the read-out image data in a second image data storage unit;
- a pixel color density converting step of reading out pixel data of a pixel of interest from the second image data storage unit, and converting a pixel color density of the pixel data based on a shifting amount of color less than a pixel unit of the shifting amount of color compensation amount;
- a half-tone processing step of performing half-tone processing of the pixel data which has undergone the color density conversion in the pixel color density converting step;
- an exceptional processing step of performing exceptional processing of the pixel data which has undergone the color density conversion in the pixel color density converting step;
- a process determination step of detecting a feature of image data formed by pixels in a predetermined region having the pixel of interest as a center of the image data stored in the second image data storage unit using attribute information that represents an attribute of the pixel data, and determining one of the exceptional processing and the half-tone processing to be selected; and
- an output step of selecting a processing result of one of the exceptional processing step and the half-tone processing step based on a determination result in the process determination step, and outputting the selected processing result as an exposure control signal of the exposure unit,
- wherein the predetermined region is set to cancel conversion of the address based on the shifting amount of color in the pixel unit in the address converting step.

15. A computer program for making a computer execute a method of controlling an image forming apparatus having an image forming unit which includes an image carrier, an exposure unit used to expose the image carrier, and a developing unit used to visualize an electrostatic latent image generated by exposure using a printing medium, and comprising a shifting amount of color storage unit adapted to store information of shifting amount of color that represents a shifting amount of color of an exposure position in a sub-scan direction upon exposing the image carrier while scanning the image carrier in a main scan direction, said method comprising:
- a shifting amount of color compensation amount calculating step of calculating a shifting amount of color compensation amount required to compensate the shifting amount of color in the sub-scan direction based on the shifting amount of color;
- a storage step of storing image data formed by a plurality of pixels in an image data storage unit;
- an address converting step of converting a coordinate of a read address of the image data storage unit based on a shifting amount of color in a pixel unit of the shifting amount of color compensation amount, and reading out pixel data of a pixel of interest from the image data storage unit in accordance with the converted address information;
- a pixel color density converting step of converting a pixel color density of the pixel data read out from the image data storage unit in the address converting step based on a shifting amount of color less than a pixel unit of the shifting amount of color compensation amount;
- a half-tone processing step of performing half-tone processing of the pixel data which has undergone the color density conversion in the pixel color density converting step;
- an exceptional processing step of performing exceptional processing of the pixel data which has undergone the color density conversion in the pixel color density converting step;
- a process determination step of detecting a feature of image data formed by pixels in a predetermined region having the pixel of interest as a center of the image data stored in the image data storage unit, and determining one of the exceptional processing and the half-tone processing to be selected; and
- an output step of selecting a processing result of one of the exceptional processing step and the half-tone processing step based on a determination result in the process determination step, and outputting the selected processing result as an exposure control signal of the exposure unit.

16. A computer program for making a computer execute a method of controlling an image forming apparatus having an image forming unit which includes an image carrier, an exposure unit used to expose the image carrier, and a developing unit used to visualize an electrostatic latent image generated by exposure using a printing medium, and comprising a shifting amount of color storage unit adapted to store information of shifting amount of color that represents a shifting amount of color of an exposure position in a sub-scan direction upon exposing the image carrier while scanning the image carrier in a main scan direction, said method comprising:
- a shifting amount of color compensation amount calculating step of calculating a shifting amount of color compensation amount required to compensate the shifting amount of color in the sub-scan direction based on the shifting amount of color;
- a storage step of storing image data formed by a plurality of pixels in a first image data storage unit;
- an address converting step of converting a coordinate of a read address of the first image data storage unit based on a shifting amount of color in a pixel unit of the shifting amount of color compensation amount, reading out image data from the first image data storage unit in accordance with the converted address information, and storing the read-out image data in a second image data storage unit;
- a pixel color density converting step of reading out pixel data of a pixel of interest from the second image data storage unit, and converting a pixel color density of the pixel data based on a shifting amount of color less than a pixel unit of the shifting amount of color compensation amount;

a half-tone processing step of performing half-tone processing of the pixel data which has undergone the color density conversion in the pixel color density converting step;

an exceptional processing step of performing exceptional processing of the pixel data which has undergone the color density conversion in the pixel color density converting step;

a process determination step of detecting a feature of image data formed by pixels in a predetermined region having the pixel of interest as a center of the image data stored in the second image data storage unit, and determining one of the exceptional processing and the half-tone processing to be selected; and an output step of selecting a processing result of one of the exceptional processing step and the half-tone processing step based on a determination result in the process determination step, and outputting the selected processing result as an exposure control signal of the exposure unit, wherein the predetermined region is set to cancel conversion of the address based on the shifting amount of color in the pixel unit in the address converting step.

17. A computer program for making a computer execute a method of controlling an image forming apparatus having an image forming unit which includes an image carrier, an exposure unit used to expose the image carrier, and a developing unit used to visualize an electrostatic latent image generated by exposure using a printing medium, and comprising a shifting amount of color storage unit adapted to store information of shifting amount of color that represents a shifting amount of color of an exposure position in a sub-scan direction upon exposing the image carrier while scanning the image carrier in a main scan direction, said method comprising:

a shifting amount of color compensation amount calculating step of calculating a shifting amount of color compensation amount required to compensate the shifting amount of color in the sub-scan direction based on the shifting amount of color;

a storage step of storing image data formed by a plurality of pixels in an image data storage unit;

an address converting step of converting a coordinate of a read address of the image data storage unit based on a shifting amount of color in a pixel unit of the shifting amount of color compensation amount, and reading out pixel data of a pixel of interest from the image data storage unit in accordance with the converted address information;

a pixel color density converting step of converting a pixel color density of the pixel data read out from the image data storage unit in the address converting step based on a shifting amount of color less than a pixel unit of the shifting amount of color compensation amount;

a half-tone processing step of performing half-tone processing of the pixel data which has undergone the color density conversion in the pixel color density converting step;

an exceptional processing step of performing exceptional processing of the pixel data which has undergone the color density conversion in the pixel color density converting step;

a process determination step of detecting a feature of image data formed by pixels in a predetermined region having the pixel of interest as a center of the image data stored in the image data storage unit using attribute information that represents an attribute of the pixel data, and determining one of the exceptional processing and the half-tone processing to be selected; and an output step of selecting a processing result of one of the exceptional processing step and the half-tone processing step based on a determination result in the process determination step, and outputting the selected processing result as an exposure control signal of the exposure unit.

18. A computer program for making a computer execute a method of controlling an image forming apparatus having an image forming unit which includes an image carrier, an exposure unit used to expose the image carrier, and a developing unit used to visualize an electrostatic latent image generated by exposure using a printing medium, and comprising a shifting amount of color storage unit adapted to store information of shifting amount of color that represents a shifting amount of color of an exposure position in a sub-scan direction upon exposing the image carrier while scanning the image carrier in a main scan direction, said method comprising:

a shifting amount of color compensation amount calculating step of calculating a shifting amount of color compensation amount required to compensate the shifting amount of color in the sub-scan direction based on the shifting amount of color;

a storage step of storing image data formed by a plurality of pixels in a first image data storage unit;

an address converting step of converting a coordinate of a read address of the first image data storage unit based on a shifting amount of color in a pixel unit of the shifting amount of color compensation amount, reading out image data from the first image data storage unit in accordance with the converted address information, and storing the read-out image data in a second image data storage unit;

a pixel color density converting step of reading out pixel data of a pixel of interest from the second image data storage unit, and converting a pixel color density of the pixel data based on a shifting amount of color less than a pixel unit of the shifting amount of color compensation amount;

a half-tone processing step of performing half-tone processing of the pixel data which has undergone the color density conversion in the pixel color density converting step;

an exceptional processing step of performing exceptional processing of the pixel data which has undergone the color density conversion in the pixel color density converting step;

a process determination step of detecting a feature of image data formed by pixels in a predetermined region having the pixel of interest as a center of the image data stored in the second image data storage unit using attribute information that represents an attribute of the pixel data, and determining one of the exceptional processing and the half-tone processing to be selected; and an output step of selecting a processing result of one of the exceptional processing step and the half-tone processing step based on a determination result in the process determination step, and outputting the selected processing result as an exposure control signal of the exposure unit, wherein the predetermined region is set to cancel conversion of the address based on the shifting amount of color in the pixel unit in the address converting step.

19. A computer-readable storage medium storing a computer program for making a computer execute a method of controlling an image forming apparatus having an image forming unit which includes an image carrier, an exposure unit used to expose the image carrier, and a developing unit used to visualize an electrostatic latent image generated by exposure using a printing medium, and comprising a shifting amount of color storage unit adapted to store information of shifting amount of color that represents a shifting amount of color of an exposure position in a sub-scan direction upon exposing the image carrier while scanning the image carrier in a main scan direction, said method comprising:

a shifting amount of color compensation amount calculating step of calculating a shifting amount of color compensation amount required to compensate the shifting amount of color in the sub-scan direction based on the shifting amount of color;

a storage step of storing image data formed by a plurality of pixels in an image data storage unit;

an address converting step of converting a coordinate of a read address of the image data storage unit based on a shifting amount of color in a pixel unit of the shifting amount of color compensation amount, and reading out pixel data of a pixel of interest from the image data storage unit in accordance with the converted address information;

a pixel color density converting step of converting a pixel color density of the pixel data read out from the image data storage unit in the address converting step based on a shifting amount of color less than a pixel unit of the shifting amount of color compensation amount;

a half-tone processing step of performing half-tone processing of the pixel data which has undergone the color density conversion in the pixel color density converting step;

an exceptional processing step of performing exceptional processing of the pixel data which has undergone the color density conversion in the pixel color density converting step;

a process determination step of detecting a feature of image data formed by pixels in a predetermined region having the pixel of interest as a center of the image data stored in the image data storage unit, and determining one of the exceptional processing and the half-tone processing to be selected; and an output step of selecting a processing result of one of the exceptional processing step and the half-tone processing step based on a determination result in the process determination step, and outputting the selected processing result as an exposure control signal of the exposure unit.

20. A computer-readable storage medium storing a computer program for making a computer execute a method of controlling an image forming apparatus having an image forming unit which includes an image carrier, an exposure unit used to expose the image carrier, and a developing unit used to visualize an electrostatic latent image generated by exposure using a printing medium, and comprising a shifting amount of color storage unit adapted to store information of shifting amount of color that represents a shifting amount of color of an exposure position in a sub-scan direction upon exposing the image carrier while scanning the image carrier in a main scan direction, said method comprising:

a shifting amount of color compensation amount calculating step of calculating a shifting amount of color compensation amount required to compensate the shifting amount of color in the sub-scan direction based on the shifting amount of color;

a storage step of storing image data formed by a plurality of pixels in a first image data storage unit;

an address converting step of converting a coordinate of a read address of the first image data storage unit based on a shifting amount of color in a pixel unit of the shifting amount of color compensation amount, reading out image data from the first image data storage unit in accordance with the converted address information, and storing the read-out image data in a second image data storage unit;

a pixel color density converting step of reading out pixel data of a pixel of interest from the second image data storage unit, and converting a pixel color density of the pixel data based on a shifting amount of color less than a pixel unit of the shifting amount of color compensation amount;

a half-tone processing step of performing half-tone processing of the pixel data which has undergone the color density conversion in the pixel color density converting step;

an exceptional processing step of performing exceptional processing of the pixel data which has undergone the color density conversion in the pixel color density converting step;

a process determination step of detecting a feature of image data formed by pixels in a predetermined region having the pixel of interest as a center of the image data stored in the second image data storage unit, and determining one of the exceptional processing and the half-tone processing to be selected; and an output step of selecting a processing result of one of the exceptional processing step and the half-tone processing step based on a determination result in the process determination step, and outputting the selected processing result as an exposure control signal of the exposure unit, wherein the predetermined region is set to cancel conversion of the address based on the shifting amount of color in the pixel unit in the address converting step.

21. A computer-readable storage medium storing a computer program for making a computer execute a method of controlling an image forming apparatus having an image forming unit which includes an image carrier, an exposure unit used to expose the image carrier, and a developing unit used to visualize an electrostatic latent image generated by exposure using a printing medium, and comprising a shifting amount of color storage unit adapted to store information of shifting amount of color that represents a shifting amount of color of an exposure position in a sub-scan direction upon exposing the image carrier while scanning the image carrier in a main scan direction, said method comprising:

a shifting amount of color compensation amount calculating step of calculating a shifting amount of color compensation amount required to compensate the shifting amount of color in the sub-scan direction based on the shifting amount of color;

a storage step of storing image data formed by a plurality of pixels in an image data storage unit;

an address converting step of converting a coordinate of a read address of the image data storage unit based on a shifting amount of color in a pixel unit of the shifting amount of color compensation amount, and reading out pixel data of a pixel of interest from the image data storage unit in accordance with the converted address information;

a pixel color density converting step of converting a pixel color density of the pixel data read out from the image data storage unit in the address converting step based on a shifting amount of color less than a pixel unit of the shifting amount of color compensation amount;

a half-tone processing step of performing half-tone processing of the pixel data which has undergone the color density conversion in the pixel color density converting step;

an exceptional processing step of performing exceptional processing of the pixel data which has undergone the color density conversion in the pixel color density converting step;

a process determination step of detecting a feature of image data formed by pixels in a predetermined region having the pixel of interest as a center of the image data stored in the image data storage unit using attribute information that represents an attribute of the pixel data, and determining one of the exceptional processing and the half-tone processing to be selected; and an output step of selecting a processing result of one of the exceptional processing step and the half-tone processing step based on a determination result in the process determination step, and outputting the selected processing result as an exposure control signal of the exposure unit.

22. A computer-readable storage medium storing a computer program for making a computer execute a method of controlling an image forming apparatus having an image forming unit which includes an image carrier, an exposure unit used to expose the image carrier, and a developing unit used to visualize an electrostatic latent image generated by exposure using a printing medium, and comprising a shifting amount of color storage unit adapted to store information of shifting amount of color that represents a shifting amount of color of an exposure position in a sub-scan direction upon exposing the image carrier while scanning the image carrier in a main scan direction, said method comprising:

a shifting amount of color compensation amount calculating step of calculating a shifting amount of color compensation amount required to compensate the shifting amount of color in the sub-scan direction based on the shifting amount of color;

a storage step of storing image data formed by a plurality of pixels in a first image data storage unit;

an address converting step of converting a coordinate of a read address of the first image data storage unit based on a shifting amount of color in a pixel unit of the shifting amount of color compensation amount, reading out image data from the first image data storage unit in accordance with the converted address information, and storing the read-out image data in a second image data storage unit;

a pixel color density converting step of reading out pixel data of a pixel of interest from the second image data storage unit, and converting a pixel color density of the pixel data based on a shifting amount of color less than a pixel unit of the shifting amount of color compensation amount;

a half-tone processing step of performing half-tone processing of the pixel data which has undergone the color density conversion in the pixel color density converting step;

an exceptional processing step of performing exceptional processing of the pixel data which has undergone the color density conversion in the pixel color density converting step;

a process determination step of detecting a feature of image data formed by pixels in a predetermined region having the pixel of interest as a center of the image data stored in the second image data storage unit using attribute information that represents an attribute of the pixel data, and determining one of the exceptional processing and the half-tone processing to be selected; and an output step of selecting a processing result of one of the exceptional processing step and the half-tone processing step based on a determination result in the process determination step, and outputting the selected processing result as an exposure control signal of the exposure unit, wherein the predetermined region is set to cancel conversion of the address based on the shifting amount of color in the pixel unit in the address converting step.

* * * * *